US010139637B2

(12) United States Patent
Costa et al.

(10) Patent No.: US 10,139,637 B2
(45) Date of Patent: Nov. 27, 2018

(54) INTEGRATED MOBILE DEVICE PACKAGING AND VIRTUAL REALITY HEADSET

(71) Applicant: Google Inc., Mountain View, CA (US)

(72) Inventors: Antonio Bernardo Monteiro Costa, San Francisco, CA (US); Erik Hubert Dolly Goossens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 15/052,432

(22) Filed: Feb. 24, 2016

(65) Prior Publication Data
US 2017/0031165 A1 Feb. 2, 2017

Related U.S. Application Data

(63) Continuation-in-part of application No. 14/815,124, filed on Jul. 31, 2015, now Pat. No. 9,857,595.

(51) Int. Cl.
G02B 27/01 (2006.01)
G02B 27/02 (2006.01)
(Continued)

(52) U.S. Cl.
CPC ......... G02B 27/028 (2013.01); G02B 27/017 (2013.01); G02B 27/0176 (2013.01);
(Continued)

(58) Field of Classification Search
CPC ........ G02B 2027/0169; G02B 27/0176; G02B 27/101; G02B 27/0149; G02B 27/0127
See application file for complete search history.

(56) References Cited

U.S. PATENT DOCUMENTS 4,773,747 A 9/1988 Bresnahan
4,846,553 A 7/1989 Rice
(Continued)

FOREIGN PATENT DOCUMENTS

CN 204188882 U 3/2015
EP 0708350 A1 4/1996
(Continued)

OTHER PUBLICATIONS

"Google Cardboard", promotional materials found at www.goggle.com/cardboard, printed May 12, 2015, 3 pages. First available approximately Jun. 27, 2014.
(Continued)

*Primary Examiner* — Darryl J Collins
*Assistant Examiner* — Journey Sumlar
(74) *Attorney, Agent, or Firm* — Brake Hughes Bellermann LLP

(57) ABSTRACT

In a general aspect, an apparatus can include a base portion that is open on a first side, and a first lens and a second lens disposed within a second side of the base portion. The apparatus can also include a ledge disposed around at least a portion of an interior perimeter of the base portion, the ledge being configured to physically support an electronic device inserted from the first side of the base portion. The apparatus can further include a lid portion that is open on a first side and closed on a second side, and a hinge that couples the base portion with the lid portion. The base portion, the lid portion and the hinge can be configured such that the base portion and the lid portion are hingeably moveable, relative to one another, between an open position and a closed position.

25 Claims, 30 Drawing Sheets

(51) Int. Cl.
G02B 27/22 (2018.01)
G02B 23/18 (2006.01)

(52) U.S. Cl.
CPC .............. *G02B 27/22* (2013.01); *G02B 23/18* (2013.01); *G02B 2027/0134* (2013.01); *G02B 2027/0138* (2013.01)

(56) References Cited

U.S. PATENT DOCUMENTS

| | | | |
|---|---|---|---|
| 5,344,065 | A | 9/1994 | Moran |
| D374,002 | S | 9/1996 | Bassett et al. |
| D415,146 | S | 10/1999 | Koichiro |
| 6,046,727 | A | 4/2000 | Rosenberg |
| D427,982 | S | 7/2000 | Daisuke |
| D444,155 | S | 6/2001 | Morooka et al. |
| D601,641 | S | 10/2009 | Wa-Sang |
| 8,303,123 | B2 | 11/2012 | Kory |
| D687,434 | S | 8/2013 | Serota |
| D701,206 | S | 3/2014 | Luckey et al. |
| 8,686,959 | B2 | 4/2014 | Payne |
| D704,704 | S | 5/2014 | Tatara et al. |
| D719,953 | S | 12/2014 | Nokuo et al. |
| 8,908,015 | B2 | 12/2014 | Capper |
| 8,957,835 | B2 | 2/2015 | Hoellwarth |
| D727,318 | S | 4/2015 | García |
| D732,028 | S | 6/2015 | Kim et al. |
| D738,374 | S | 9/2015 | Luckey et al. |
| D739,855 | S | 9/2015 | Bosveld et al. |
| D740,810 | S | 10/2015 | Bosveld et al. |
| D740,814 | S | 10/2015 | Bosveld et al. |
| D741,323 | S | 10/2015 | Bosveld et al. |
| D741,327 | S | 10/2015 | Vladimir |
| 9,176,325 | B2 | 11/2015 | Lyons |
| D745,517 | S | 12/2015 | Kumagai |
| D749,583 | S | 2/2016 | Trexler et al. |
| D750,074 | S | 2/2016 | Coz et al. |
| D751,072 | S | 3/2016 | Lyons et al. |
| D753,111 | S | 4/2016 | Zhu et al. |
| D755,789 | S | 5/2016 | Lyons et al. |
| D757,003 | S | 5/2016 | Dolly |
| 9,405,126 | B1 | 8/2016 | Margolin |
| D765,658 | S | 9/2016 | Spio et al. |
| D766,896 | S | 9/2016 | Lou et al. |
| D792,398 | S | 7/2017 | Costa et al. |
| 9,869,874 | B2 | 1/2018 | Zhang |
| 2010/0079356 | A1 | 4/2010 | Hoellwarth et al. |
| 2010/0277575 | A1 | 11/2010 | Ismael |
| 2013/0082963 | A1 | 4/2013 | Chu |
| 2013/0147721 | A1 | 6/2013 | McGeever |
| 2014/0176608 | A1 | 6/2014 | Boysen et al. |
| 2014/0247246 | A1 | 9/2014 | Maus |
| 2014/0267637 | A1 | 9/2014 | Hoberman |
| 2015/0111624 | A1 | 4/2015 | Peel |
| 2015/0138645 | A1 | 5/2015 | Kim |
| 2015/0215608 | A1 | 7/2015 | Tahara |
| 2015/0234189 | A1 | 8/2015 | Lyons et al. |
| 2015/0253574 | A1 | 9/2015 | Thurber |
| 2016/0018853 | A1 | 1/2016 | Buckley |
| 2016/0025990 | A1 | 1/2016 | Zhang |
| 2016/0062454 | A1 | 3/2016 | Choi et al. |
| 2016/0180591 | A1 | 6/2016 | Chang |
| 2016/0203642 | A1 | 7/2016 | Thomas |
| 2016/0232715 | A1 | 8/2016 | Lee |
| 2016/0349836 | A1 | 12/2016 | Goossens et al. |
| 2017/0031164 | A1 | 2/2017 | Costa et al. |
| 2017/0108703 | A1 | 4/2017 | Kong |

FOREIGN PATENT DOCUMENTS

| | | |
|---|---|---|
| EP | 2942305 A1 | 11/2015 |
| EP | 3329322 A1 | 6/2018 |
| ES | 1115455 U | 7/2014 |
| GB | 2516242 A | 1/2015 |
| WO | 2012035174 A1 | 3/2012 |
| WO | 2014057557 A1 | 4/2014 |
| WO | 2014103006 A1 | 7/2014 |
| WO | 2014108693 A1 | 7/2014 |

OTHER PUBLICATIONS

"Multipart Plan" dated Feb. 26, 2014, 1 page.
"Photo 1" posted to Instagram by inventor on Oct. 6, 2013, 1 page.
"Photo 2" posted to Instagram by inventor on Oct. 6, 2013, 1 page.
"Photo 3" posted to Instagram by inventor on Oct. 6, 2013, 1 page.
Notice of Allowance received for Design U.S. Appl. No. 29/516,996, dated Oct. 23, 2015, 12 pages.
Notice of Allowance received for Design U.S. Appl. No. 29/528,284, dated Feb. 5, 2016, 6 pages.
Kastrenakes, J., The VERGE: This phone's packaging doubles as a Google Cardboard VR viewer; Feb. 10, 2016, 2 pages.
Invitation to Pay Additional Fees and Partial Search Report for PCT Application No. PCT/US2016/033212, dated Aug. 1, 2016, 7 Pages.
Brewster, "Why Google Cardboard is actually a huge boost for virtual reality", retrieved on Jun. 24, 2016 from https://gigaom.com/2014/06/28/why-google-cardboard-is-actually-a-huge-boost-for-virtual-reality/, Jun. 28, 2014, 7 pages.
DODOcase, "DODOcase Virtual Reality Kit 1.2 Assembly Instruction Video YouTube", retrieved on Jun. 24, 2016 from https://www.youtube.com/watch?v=ze1528521Yw, Oct. 8, 2014, 3 pages.
Evans, "The Exciting Possibilities of DIY Virtual Reality", retrieved on Jun. 24, 2016 from http://blog.fictiv.com/posts/the-exciting-possibilities-of-diy-virtual-reality, Dec. 8, 2014, 11 pages.
Hoberman, et al., "Immersive Training Games for Smartphone-Based Head Mounted Displays", retrieved on Jun. 24, 2016 from http://projects.ict.usc.edu/mxr/wp-content/uploads/2011/12/SmartphoneVR.pdf, 2012, 2 pages.
Ladysith, "Copper tape touch extension for Cardboard VR kits", retrieved on Jun. 24, 2016 from https://web.archive.org/web/20150101222824/http://www.instructables.com/id/CoppertapetouchextensionforCardboardVRkits, Jan. 1, 2015, 5 pages.
International Search Report and Written Opinion for PCT Application No. PCT/US16/34756, dated Sep. 2, 2016, 10 pages.
Touthackamon, "How to make DODOCase VR kit V 1.2 from your old V 1.1", retrieved on Jun. 24, 2016 from https://web.archive.org/web/20141101135535/http://www.instructables.com/id/How-to-make-DODOCase-VR-kit-V-12-from-your-old-V-1/, Nov. 1, 2014, 8 pages.
International Search Report and Written Opinion for PCT Application No. PCT/US2016/033212, dated Sep. 23, 2016, 15 pages.
Invitation to Pay Add'l Fees and Partial Search Report for PCT Application No. PCT/US2016/43492, dated Oct. 6, 2016, 7 Pages.
Non-Final Office Action for U.S. Appl. No. 14/815,124, dated Jan. 18, 2017, 28 pages.
International Search Report and Written Opinion for PCT Patent Application No. PCT/US2016/043492, dated Dec. 2, 2016, 13 pages.
Non Final Office Action for U.S. Appl. No. 14/617,223, dated Feb. 27, 2017, 45 pages.
Notice of Allowance for U.S. Appl. No. 29/534,813, dated Mar. 21, 2017, 39 pages.
Response to Final Office Action for U.S. Appl. No. 14/815,124, filed Jul. 13, 2017, 8 pages.
Written Opinion for PCT Application No. PCT/US16/34756, dated Jul. 3, 2017, 5 pages.
International Preliminary Report on Patentability for PCT Application No. PCT/US2016/034756, dated Oct. 20, 2017, 7 pages.

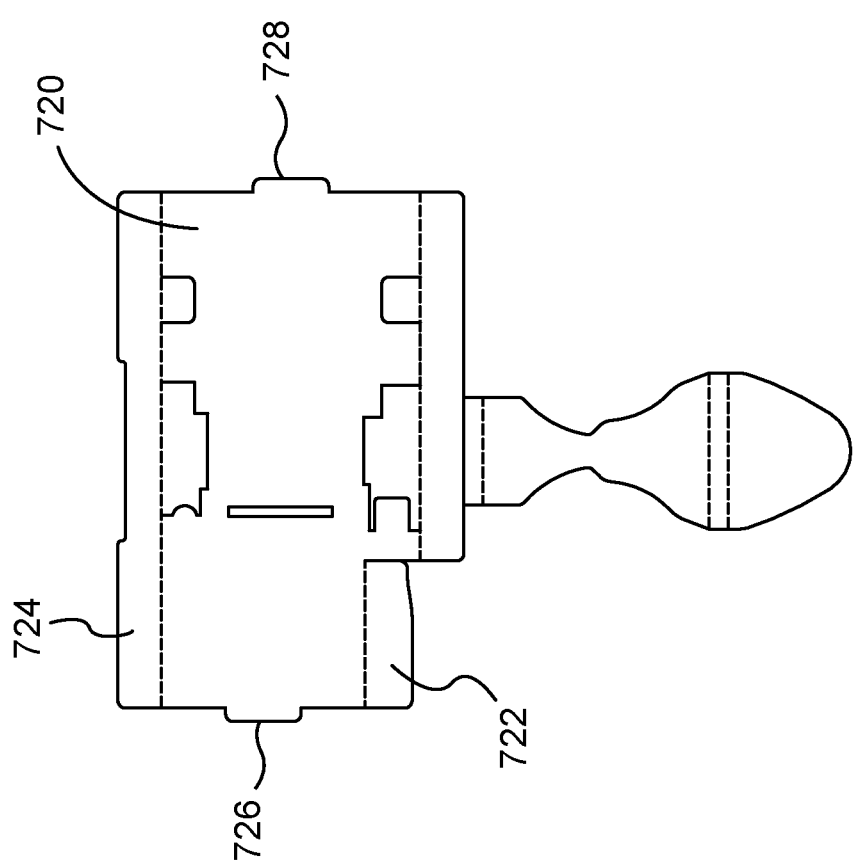

INTEGRATED MOBILE DEVICE PACKAGING AND VIRTUAL REALITY HEADSET

CROSS-REFERENCE TO RELATED APPLICATION

This application is a Continuation-in-Part of, and claims priority to, U.S. patent application Ser. No. 14/815,124, filed on Jul. 31, 2015, entitled "SMARTPHONE PACKAGING AND VIRTUAL REALITY HEADSET", the disclosure of which is incorporated by reference herein in its entirety.

TECHNICAL FIELD

This disclosure relates to packaging for mobile electronic devices (e.g., smartphone shipping containers) that include integrated virtual reality headsets for use with a respective mobile electronic device. More specifically, this disclosure relates to packaging for mobile electronic devices where the shipping container is configured to be used as a virtual reality headset.

SUMMARY

In a general aspect, an apparatus can include a base portion that is open on a first side, and a first lens and a second lens disposed within a second side of the base portion. The apparatus can also include a ledge disposed around at least a portion of an interior perimeter of the base portion, the ledge being configured to physically support an electronic device inserted from the first side of the base portion. The apparatus can further include a lid portion that is open on a first side and closed on a second side, and a hinge that couples the base portion with the lid portion. The base portion, the lid portion and the hinge can be configured such that the base portion and the lid portion are hingeably moveable, relative to one another, between an open position and a closed position.

Implementations can include one or more of the following features. For example, the base portion and the lid portion can have corresponding angled mating surfaces. The base portion can include an outer base portion having a first lens aperture, a second lens aperture and an inner base portion. The inner base portion can include a first lens aperture aligned with the first lens aperture of the outer base portion and a second lens aperture aligned with the second lens aperture of the outer base portion. The base portion can include an adhesive layer affixing the inner base portion to the outer base portion. The inner base portion can be at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion. The first lens and the second lens can each include a plurality of tabs configured to fixedly retain the first lens and the second lens between the inner base portion and the outer base portion.

The base portion and the lid portion can have a cutout defined therein. The cutout can be configured for placement over a nose of a user.

The apparatus can include a button mechanism affixed with the base portion. The button mechanism can be configured to selectably interact with a touchscreen of the electronic device. The base portion can include an aperture that is associated with the button mechanism. A portion of the button mechanism can be exposed through the aperture. The button mechanism can include a conductive material.

The base portion can include an inner base portion and an outer base portion. The button mechanism can be fixedly retained between the inner base portion and the outer base portion. The inner base portion can include a cutout configured to receive a portion of the button mechanism. The outer base portion can include an aperture that is associated with the button mechanism. A portion of the button mechanism can be exposed through the aperture.

The base portion can include an inner base portion and an outer base portion. The inner base portion can include a recessed portion. The button mechanism can be fixedly attached to the recessed portion, such that the button mechanism is fixedly retained between the inner base portion and the outer base portion. The inner base portion can include a cutout configured to receive a portion of the button mechanism.

The hinge can include a first hinge portion and a second hinge portion. The first hinge portion can be coupled with at least one interior surface of the apparatus. The second hinge portion can be coupled with at least one exterior surface of the apparatus.

In another general aspect, an article of manufacture can include a base portion that is open on a first side, and a first lens and a second lens disposed within a second side of the base portion. The article can also include a ledge disposed around at least a portion of an interior perimeter of the base portion. The ledge can be configured to physically support an electronic device inserted from the first side of the base portion. The article can also include a lid portion that is open on a first side and closed on a second side. The article can also include a hinge that couples the base portion with the lid portion. The base portion, the lid portion and the hinge can be configured such that the base portion and the lid portion are hingeably moveable, relative to one another, between an open position and a closed position. The article can also include a sleeve configured to slidably fit over the base portion and the lid portion when in the closed position. The article can further include a tray that is configured to be placed within the base portion. The tray can include a plurality of legs configured to prevent physical contact between the tray and the first lens and the second lens.

Implementations can include one or more of the following features. For example, the tray can be configured to contain at least one accessory for the electronic device. The base portion and the lid portion can have corresponding angled mating surfaces.

The base portion can include an outer base portion and an inner base portion. The outer base portion can have a first lens aperture and a second lens aperture. The inner base portion can have a first lens aperture aligned with the first lens aperture of the outer base portion and a second lens aperture aligned with the second lens aperture of the outer base portion. The base portion can include an adhesive layer affixing the inner base portion to the outer base portion, the inner base portion being at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion.

The base portion and the lid portion can have a cutout defined therein. The cutout can be configured for placement over a nose of a user.

The article can include a button mechanism affixed with the base portion. The button mechanism can be configured to selectably interact with a touchscreen of the electronic device.

The hinge can include a first hinge portion and a second hinge portion. The first hinge portion can be coupled with at least one interior surface of the apparatus. The second hinge portion can be coupled with at least one exterior surface of the apparatus.

The details of one or more implementations are set forth in the accompanying drawings and the description below. Other features will be apparent from the description and drawings, and from the claims.

BRIEF DESCRIPTION OF THE DRAWINGS

FIG. 7D is a diagram illustrating a plan view of a second portion of the accessory tray of FIG. 7A, shown in a flat, pre-folded configuration, according to an implementation.

Figure 1:
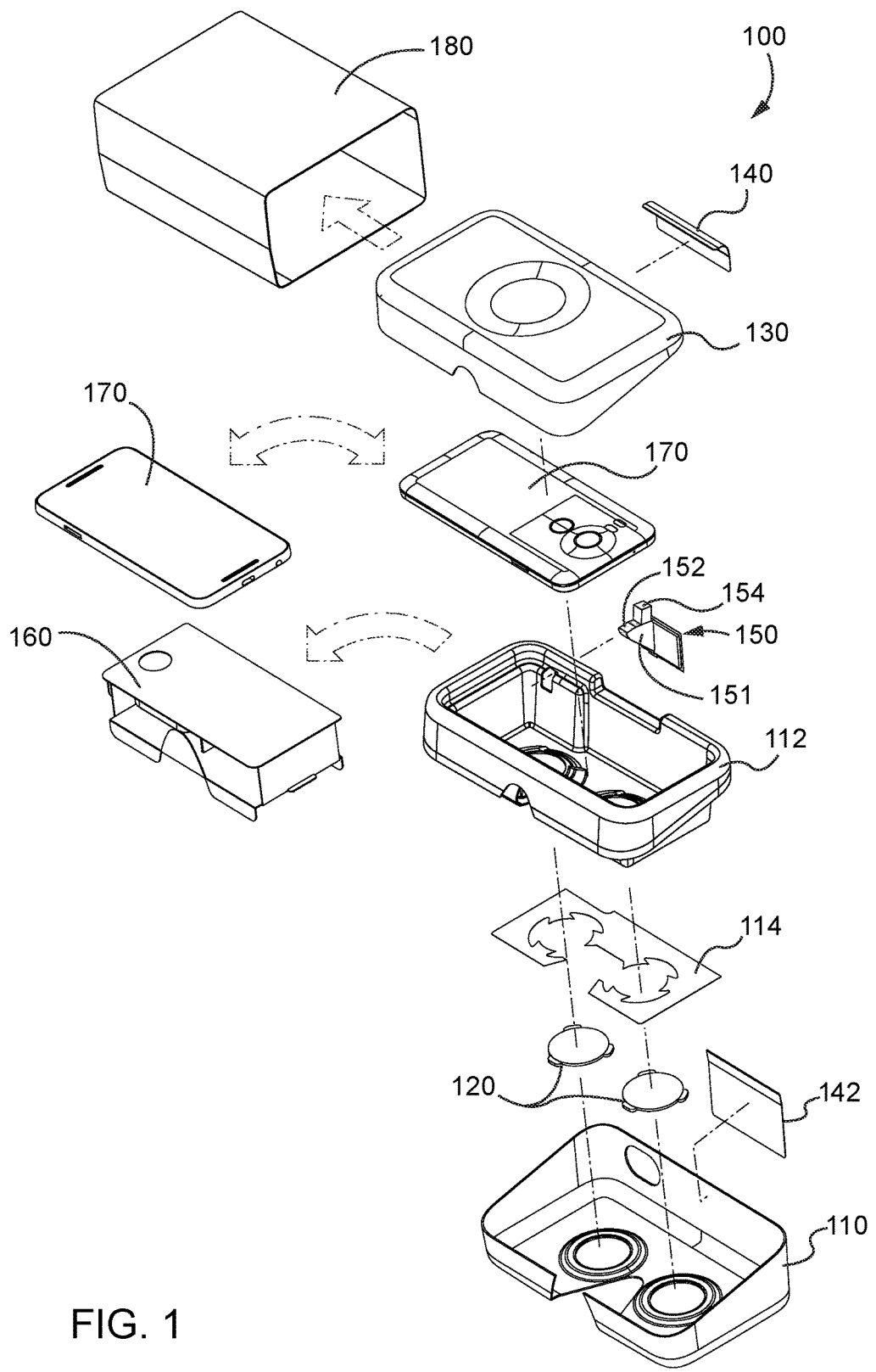
FIG. 1 is a drawing illustrating an exploded, perspective view of an integrated mobile device shipping container (packaging) and virtual reality (VR) headset, according to an implementation.

Like reference symbols in the various drawings indicate like elements. Reference numbers for some like elements may not be repeated for all such elements. Some reference numbers for certain elements of a given implementation may not be repeated in each drawing corresponding with that implementation. Some reference numbers for certain elements of a given implementation may be repeated in other drawings corresponding with that implementation, but may not be specially discussed with reference to each corresponding drawing.

DETAILED DESCRIPTION

This disclosure is directed to virtual reality (VR) headsets (which can also be referred to as VR goggles) that can be provided to users at a relatively low cost as compared with other VR headset implementations. The VR headsets described herein can be integrated with a shipping container (e.g., commercial packaging) that can be used to ship a corresponding consumer electronic device (e.g., a smartphone, tablet, etc.) from a manufacturer to a consumer. That is, a consumer can use such a shipping container (in which the consumer receives the corresponding electronic device) as a VR headset to experience visual images associated with VR applications or content that can be executed or played on the corresponding electronic device. For purposes of this disclosure, an integrated shipping container and VR headset may also be referred to as an integrated shipping container, integrated packaging, a shipping container, packaging, an integrated VR headset, an integrated headset, a VR headset, a headset, and so forth.

Such an integrated shipping container (for a given consumer electronic device) may be used (e.g., by a receiving consumer) as a VR headset (e.g., where the integrated VR headset is specifically designed for use with the given electronic device), where the elements of the VR headset are integrated with one or more elements of specifically designed shipping container. For instance, after receiving an electronic device that is packaged and shipped using such an integrated shipping container, a consumer can unpack the electronic device from the integrated shipping container, remove one or more accessories (e.g., cables, etc.), remove (e.g., discard or recycle) any protective packaging materials (such as those described herein), and insert and secure the electronic device in the integrated VR headset in an orientation suitable for viewing a display of the electronic device with the integrated VR headset. The consumer can then view images associated with (produced by) VR applications or content (e.g., executed or played by the electronic device), where those images are displayed on a display panel (e.g., a touchscreen) of the electronic device (e.g., a smartphone, tablet, or the like) and viewed using the integrated VR headset, so as to experience the content as virtual reality content (e.g., in a virtual, 3-dimensional view).

The integrated shipping container and VR headset implementations shown in the figures and described herein are given by way of example. Accordingly, features of one implementation can be included in other implementations, where appropriate. Further, features of a given implementation can be omitted in other implementations. Also, the elements of the implementations shown in the figures and described herein are illustrative and may not be shown to scale. Further, the arrangement of the particular elements of a given apparatus can depend on the specific implementation.

For purposes of this disclosure, the various elements of the example integrated shipping container and VR headset implementations illustrated and described herein may be referenced using relative terms, such as top, left, right, bottom, etc. These terms are used by way of illustration to describe the example implementations. In other implementations, or other orientations, these references may change. For instance, a left side of a VR headset in one view may be referred to as a right side in another view of that VR headset, or in another VR headset implementation. In some instances, such relative terms can reference other views of an implementation. For instance, a view illustrated as a right-side view of an implementation may refer to right-side of that implementation as shown in a related perspective-view.

Additionally, elements of the integrated shipping container and VR headset implementations described herein may be referred to using enumerated references, e.g., first, second, etc. As noted above with respect to relative references, such enumerated references could change depending on the particular orientation (in a given drawing) or the particular implementation of an integrated shipping container and VR headset. For instance a first end or side in one view could be referred to as a second end or side in another view, or when discussing a different integrated VR headset implementation.

Further, elements of a given implementation shown in one drawing may not be shown in another drawing for that implementation. For instance, electronic device protective packaging materials (e.g., used for shipping purposes) shown in FIG. 1 are not shown in each drawing that is directed to the implementation of FIG. 1.

Also, while not specifically shown in the drawings, elements of the integrated shipping container and VR headset implementations described herein can include logos and or branding that is disposed or printed on the various components, such on a lid portion, a protective sleeve, etc. Such logos or branding can vary depending on the particular implementation.

FIG. 1 is a drawing illustrating an exploded, perspective view of an integrated shipping container (packaging) and virtual reality (VR) headset 100, according to an implementation. In FIG. 1, the integrated shipping container and VR headset 100 is illustrated with elements that may be included when using the integrated shipping container and VR headset 100 as a shipping container (e.g., commercial packaging). As shown, in FIG. 1, the integrated shipping container and VR headset (integrated VR headset) 100, in this implementation, can include a base portion that includes an outer base portion 110 and an inner base portion 112. The integrated VR headset 100 can also include an adhesive layer 114 that can be used to affix (attach, secure, bond, and so forth) the outer base portion 110 with the inner base portion 114. In other implementations, other approaches can be used to affix the outer base portion 110 with the inner base portion 114, such as glue, tape, epoxy, hook and loop, or an appropriate adhesive or connective material.

As shown in FIG. 1, the base portion of the integrated VR headset 100 (e.g., the inner base portion 110 affixed to the outer base portion 110 with the adhesive layer 114 and housing the lenses 120) can take the form of a chassis that is open on a first side. In other implementations, the base portion can have other configurations. However, in the implementation shown in FIG. 1, the base portion can include a left side, a right side, a bottom side and a top side, such as shown in FIG. 1. In such an approach, the left side, the right side, the bottom side and the top side of the base portion can define the open, first side of the base portion (e.g., including the upward facing, open sides of the inner base portion 112 and the outer base portion 110 in FIG. 1).

The integrated VR headset 100 can also include a pair of lenses 120 (e.g., a first aspherical lens and a second aspherical lens), that can be mounted (secured, retained, etc.) between the outer base portion 110 and the inner base portion 114, e.g., when the outer base portion 110 is affixed with the inner base portion 112.

The integrated VR headset 100 can also include a lid portion 130. In the integrated VR headset 100 shown in FIG. 1, the lid portion 130 of the integrated VR headset 100 can be hingeably coupled with the base portion. For instance, in this implementation, as shown in FIG. 1, a first hinge portion 140 can be affixed with the lid portion 130 and a second hinge portion 142 can be affixed with the outer base portion 110. The first hinge portion 140 can then be engaged (e.g., adhesively, mechanically, etc.) with the second hinge portion 142. In other implementations, the first hinge portion 140 and the second hinge portion could both be engaged with both the lid portion and the base portion (e.g., the outer base portion and/or the inner base portion 112). In still other implementations, the integrated VR headset 100 can include a single hinge portion that is used to hingeably couple the lid portion 130 with the base portion.

The hinge portions 140 and 142 can be formed from a number of appropriate materials, such as plastic, fabric, coated paper, adhesive coated polymer, etc. In some implementations, the hinge portions 140 and 142 may be formed of flexible materials. In other implementations, the hinge portions 140 and 142 can be formed of rigid materials that, when engaged with one another, hingeably move at their engagement (connection, etc.) point. In still other implementations, the hinge portions 140 and 142 can be formed of a combination of a number of appropriate materials.

As shown in FIG. 1, the integrated VR headset 100 can also include a button mechanism 150 that can be used to allow a user of the integrated VR headset 100 to interact with a VR content being played or displayed via a touchscreen of a corresponding electronic device 170, such as by providing a selectable conductive path from a button of the integrated VR headset 100 to the touchscreen of the electronic device 170. As shown in FIG. 1, the button mechanism 150 can be disposed between the inner base portion 112 and the outer base portion 110. Depending on the implementation, the button mechanism can be affixed (e.g., glued, adhered, bonded, etc.) to the outer base portion 112 and or the inner base portion 110, such that the button mechanism remains in a fixed alignment (position, arrangement, etc.) within the integrated VR headset 100.

While described in further detail below, the button mechanism 150 can include a wedge 151 and a block 154. The wedge 151 can extend through the inner base portion 112 and be configured to selectively make contact with the touchscreen of the electronic device 170 (e.g., in response to a user depressing the button mechanism through an input button aperture in the other base portion 110). In implementations, such as the integrated VR headset 100 of FIG. 1, the button mechanism 150 (e.g., in combination with the inner base portion 112 and/or the outer base portion 110) can be configured to be resilient. In other words, the button mechanism 150 can be biased such that, without the button mechanism 150 being depressed (e.g., by a finger of a user) or subjected to an external force, the wedge is not in contact with the touchscreen of the electronic device 170. In such implementations, after an external force used to depress the button mechanism 150 (e.g., to cause an outer surface of the wedge 151 to come in contact with the touchscreen of the electronic device 170) is removed, the button mechanism 150 would return to its biased (normal) position (e.g., with the wedge 151 not being in contact with the touchscreen of the electronic device 170).

The block 154 of the integrated VR headset 100 (which can be formed from a resilient material, such as a resilient foam material) can be used to provide a spring force for the button mechanism 150, such as to return the button mechanism to its biased (normal) position after being depressed by a user (e.g., once an external force is removed). The block 154 can also act as a stop for the button mechanism 150. For instance, when the button mechanism 150 is depressed, the block 154 can be configured to be compressed against a backside surface (not visible in FIG. 1) of the inner base portion 112, so as to prevent the wedge 151 from exerting excessive pressure on the touchscreen of the electronic device 170 and, due resiliency of the block 154, return the button mechanism 150 to its biased position when the it is no longer being depressed (e.g., an external force is removed, the button mechanism is released, etc.).

In some implementations, the wedge 151 can be formed of a conductive material, such as conductive foam, or other appropriate conductive material. In other implementations, the wedge 151 can be formed from a non-conductive material that is then coated with, or covered with a conductive material. As an example, as shown in FIG. 1, the button mechanism can include a conductive tape 152 that is disposed on at least a portion of the wedge 151 and extends around a backside of the button mechanism 150 (e.g., such that it is exposed through an input button aperture of the outer base portion 110). Such an approach creates a conductive path from the portion of the button mechanism 150 that is exposed through the outer base portion 110 to the wedge 151. Accordingly, when a user depresses the button mechanism to selectively contact the wedge 151 with the touchscreen of the electronic device, a ground path from the user to the touchscreen of the electronic device 170 is created, allowing the user to interact with VR content being viewed on the electronic device 170. An example implementation of the conductive tape 152 that can be implemented in the integrated VR headset 100 is shown in further detail in FIGS. 6A and 6B and discussed further below.

As further shown in FIG. 1, the integrated VR headset 100 can also include an accessory tray 160 and a sleeve (outer sleeve) 180. As described herein, the integrated VR headset 100 can be used to ship the electronic device 170 (e.g., with the electronic device 170 being disposed on top of the accessory tray 160). During shipping of the electronic device to a consumer, any corresponding accessories (not shown) for the electronic device 170 can be disposed within the accessory tray 160. The accessory tray 160 can prevent those accessories from causing damage, such as scratches to the lenses 120, during shipping of the electronic device. While not shown in FIG. 1, accessories that may disposed within the accessory tray 160 can include a Universal Serial Bus (USB) charging cable, a power adaptor a headset, product documentation, etc. It will be appreciated that, in other implementations, the accessory tray 160 can have other configurations than those described herein, and can be used to ship different components than those described with respect to FIG. 1. An example implementation of the accessory tray 160 is illustrated in FIGS. 7A-7D and is described in further detail below.

As shown in FIG. 1, the sleeve 180 can be configured to slidably fit over the lid portion 130 and base portion (including outer base portion 110 and inner base portion 112) of the integrated VR headset 100 when the lid portion 130 is hingeably attached to the base portion and in a closed position. In such an approach, the sleeve 180 may provide protection for the other components of the integrated VR headset 100 (e.g., the lenses 120) during shipping and handling (e.g., from a manufacturer to a consumer), where the accessory tray 160, the electronic device 170 and any corresponding accessories are disposed within the lid portion 130 and the base portion of the integrated VR headset 100. In certain implementations, the sleeve 180 can be secured to the outer base portion 110 and or the lid portion 130 using one or more adhesive discs or strips (e.g., tape), which can be severed and/or removed to allow the sleeve 180 to be removed from the remainder of the integrated VR headset 100.

In some implementations, the integrated VR headset 100 can also include a near-field communications (NFC) tag (not shown). In other implementations, another appropriate identification mechanism, such as an RFID tag, could be used. In implementations using an NFC tag, the NFC tag can take the form of an adhesive backed tag or sticker that is affixed to, for example, the lid portion 130 of the integrated shipping container and VR headset 100. In other implementations, such an NFC tag could be affixed to one of the inner base portion 112, or the outer base portion 110. Such an NFC tag (or other identification mechanism) can be used to identify the integrated VR headset 100 to the electronic device 170 when the electronic device 170 is inserted in the integrated VR headset 100 (or otherwise in close proximity with the integrated VR headset 100.

Identification of the integrated VR headset 100 by the electronic device 170 using such an NFC tag may allow the electronic device 170 to determine, for instance, that the integrated VR headset 100 corresponds the with electronic device 170 (e.g., is designed specifically for shipping the electronic device 170 and for viewing VR content on the electronic device 170). In other implementations, such an NFC tag can be used to allow for a different electronic device (e.g., one that the integrated VR headset 100 is not specifically designed for) to determine a number of characteristics about the integrated VR headset 100, such as a focal length of the lenses 120, physical dimensions of the integrated VR headset 100, etc. Other electronic devices (e.g., for which the integrated VR headset 100 is not specifically designed) may use such characteristics of the integrated VR headset 100 (e.g., determined from an NFC tag) to modify how those devices render visual VR content (e.g., to improve a user experience).

As shown in FIG. 1, the electronic device 170 can be placed in the integrated shipping container and VR headset 100 (e.g., within, and on a ledge of, the inner base portion 112), either with the touchscreen of the electronic device 170 facing up (e.g., the orientation of the electronic device 170 shown on the left in FIG. 1) or with the touchscreen of the electronic device 170 facing down (e.g., the orientation of the electronic device 170 shown on the right in FIG. 1). In this implementation, the electronic device 170 may be placed in the touchscreen-up orientation when the integrated VR headset 100 is used to ship the electronic device 170 to a consumer. Further in this implementation, the electronic device 170 may be placed in the touchscreen-down orientation (with the accessory tray 160 and any corresponding accessories removed) when the integrated VR headset 100 is used as a VR headset (e.g., when using the electronic device 170 to view VR images associated with executing and/or playing VR applications and/or content on the electronic device 170).

Depending on the particular implementation, the outer base portion 110, the inner base portion 112, the lid portion 130, the accessory tray 160 and the sleeve 180 can be made of a number of different materials. The same material can be used for each of these components of the integrated shipping container and VR headset 100, or different materials can be used for the various components. As some example materials, the outer base portion 110, the inner base portion 112, the lid portion 130, the accessory tray 160 and the sleeve 180 can be formed from cardboard, fiberboard, plastic, heavy paper stock, etc. In some implementations, the outer base portion 110, the inner base portion 112, the lid portion 130, the accessory tray 160 and the sleeve 180 can be formed using die-cutting techniques. In other implementations, other cutting (e.g., precision cutting) techniques may be used in place of die cutting, such as laser cutting, for example. In still other implementations, these components can be stamped, molded, or formed using a number of other appropriate techniques.

Figure 2A:
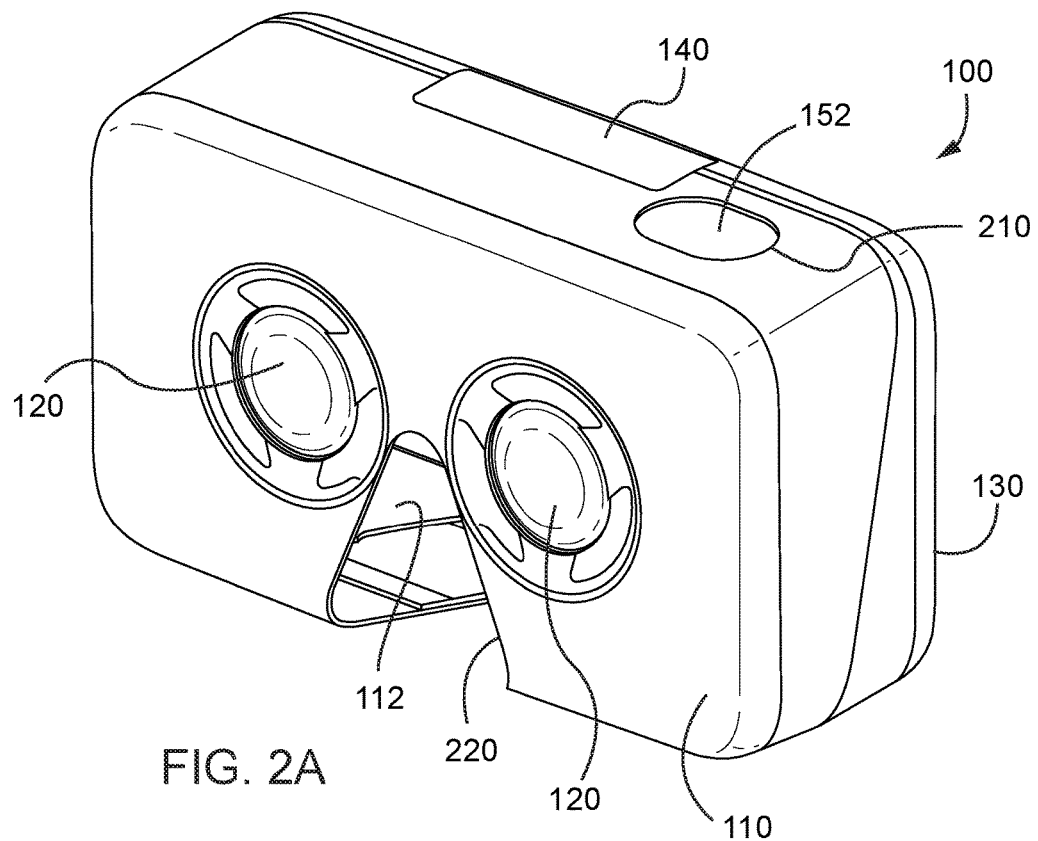
FIG. 2A is a diagram illustrating a front-side perspective view of the integrated shipping container and VR headset of FIG. 1, according to an implementation.

FIG. 2A is a diagram illustrating a front-side perspective view of the integrated VR headset 100 of FIG. 1, according to an implementation. As shown in FIG. 2A (as well as in FIGS. 2A and 3), the integrated VR headset 100 is illustrated in an arrangement for use as a VR headset (e.g., in conjunction with the electronic device 170). In the perspective view of FIG. 2A, the integrated VR headset 100 is shown from a side (referred to here as the front side) that a user can place to, or near his or her face in order to view VR content displayed on the electronic device 170, when it is inserted in the integrated VR headset 100.

Figure 2B:
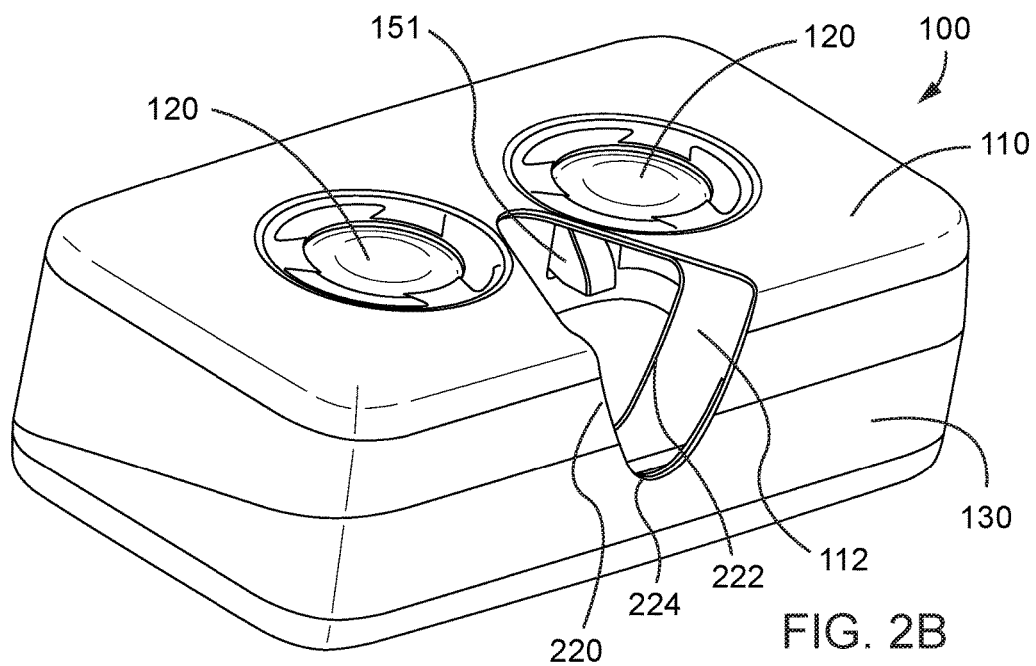
FIG. 2B is a diagram illustrating a bottom-side perspective view of the integrated shipping container and VR headset of FIG. 1, according to an implementation.

As illustrated in FIG. 2A, the outer base portion 110 can include a cutout 220, which can be aligned with complementary cutouts in the inner base portion 112 (e.g., cutout 222 shown in FIG. 2B) and the lid portion 130 (e.g., cutout 224 shown in FIG. 2B). The cutout 220 (and the complimentary cutouts in the inner base portion 112 and the lid portion 130) can be configured to facilitate placement of the integrated VR headset 100 to a face of a user, with the cutout 220 (and the complimentary cutouts in the inner base portion 112 and the lid portion 130) being placed over (about, around, etc.) the user's nose.

As further illustrated in FIG. 2A, the lenses 120 can be disposed within the base portion, where the lens are held in place by and between the outer base portion 110 and the inner base portion 112, e.g., when they are affixed to each other, such as with the adhesive layer 114, or other appropriate material. The lenses 120 can be aligned with lens apertures that are defined in the inner base portion 112 and the outer base portion 110.

As shown in FIG. 2A, the outer base portion 110 can include a button aperture 210 through which the conductive tape 152 of the button mechanism 150 can be exposed. Depending on the particular implementation, at least a portion of the conductive tape 152 can be affixed (bonded, etc.) to an interior surface of the outer base portion 110, or can be resiliently held in place within the button aperture 210 by the button mechanism 150, which could be affixed (e.g., adhesive affixed) to the inner base portion 112. The position of the button aperture 210 (and the button mechanism 150) in FIG. 2A is shown by way of example. In other implementations, the button aperture 210 and button mechanism 150 can have other arrangements. For instance, in other implementations, the button aperture 210 and button mechanism 150 could be disposed on a right side or a left side of the integrated VR headset 100, or in a different position on the top side of the integrated VR headset 100.

As shown in FIG. 2A, the first hinge portion 140 can be disposed on an exterior surface of the base portion (while also being coupled with the lid portion 130 of the integrated VR headset 100. In some implementations the first hinged portion could be the second hinge portion 142, a single hinge portion, or could have other appropriate arrangements.

FIG. 2B is a diagram illustrating a bottom-side perspective view of the integrated VR headset 100 of FIG. 1, according to an implementation. FIG. 2B illustrates the cutout 222 in the inner base portion 112 and the cutout 224 in the lid portion 130, which are complementary with the cutout 220 in the outer base portion 110 for allowing the integrated VR headset 100 to be comfortably placed over a nose of a user.

FIG. 2B also illustrates the wedge 151 of the button mechanism 150 extending through the inner base portion 112. Such an arrangement can allow the wedge 151, when the button mechanism 150 is depressed through the button aperture 210, to contact a touchscreen of an electronic device, such as described above, to interact with VR content that is being played and/or displayed on the electronic device.

Figure 3:
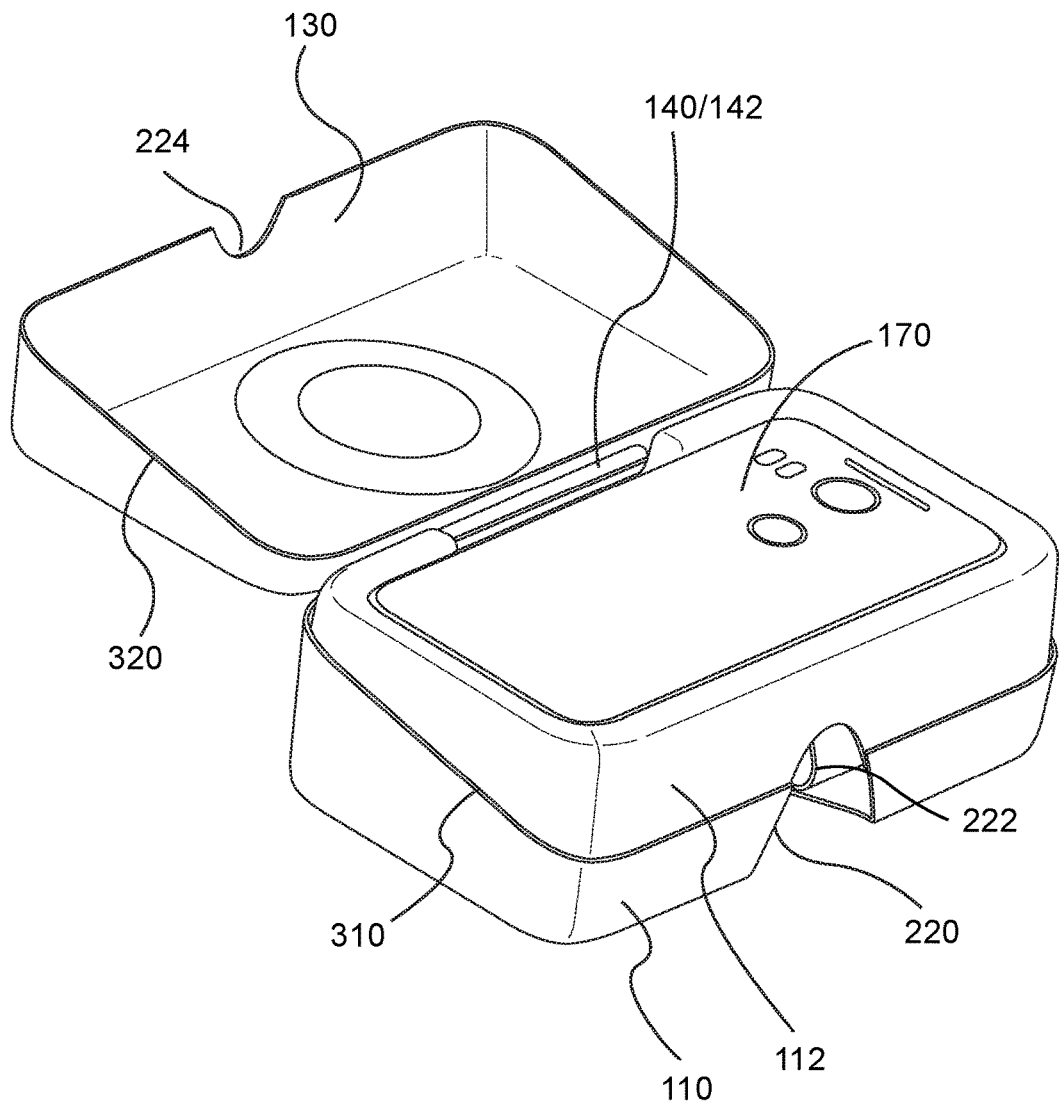
FIG. 3 is a diagram illustrating a perspective view of the integrated shipping container and VR headset of FIG. 1 with a lid portion hingeably moved to an open position, according to an implementation.

FIG. 3 is a diagram illustrating another perspective view of the integrated VR headset 100 of FIG. 1, according to an implementation. As shown in FIG. 3, the lid portion 130 of the integrated VR headset 100 is, relative to the base portion, moved to a hinged-open position (as compared with a hinged-closed position, as shown in FIGS. 2A and 2B). With the integrated VR headset 100 in the hinged-open position, a user can insert the electronic device 170 into, or remove the electronic device 170 from the inner base portion 112 of the integrated VR headset 100. When the lid portion 130 is closed, the lid portion 130 holds the electronic device 170 in place in the inner base portion 112 (e.g., for shipping in a touchscreen-up orientation or for viewing VR content in a touchscreen-down orientation).

As shown in FIG. 3, the outer base portion 110 and the lid portion 130 include, respective angled mating surfaces (edges, etc.) 310 and 320. The angled mating surfaces 310 and 320 facilitate alignment of the lid portion 130 with the base portion of the integrated VR headset 100, and also allow the lid portion 130 to be easily moved (relative to the base portion) between its hinged closed position and its hinged open position due, at least in part, to the height of the lid portion 130 along its side that is hingeably coupled with the base portion. Depending on the particular hinge configuration used, at least one of the hinge portions 140 and 142 are shown in FIG. 3. For instance, in FIG. 3 (and as discussed above), the first hinge portion 140 can be engaged (coupled, affixed, etc.) with the second hinge portion 142 between the base portion (e.g., a hinge recess 840 in the inner base portion 112) and the lid portion 130, so as to provide a pivot (hinge) point for moving the lid portion 130 (relative to the base portion) between its hinged closed position (FIGS. 2A and 2B) and its hinged open position (FIG. 3).

As shown in FIG. 3 (e.g., in conjunction with FIGS. 1, 2A and 2b, the lid portion 130 of the integrated VR headset 100 of FIG. 1 (as with the base portion) can take the form of a chassis that is open on a first side so as to facilitate its placement over the inner base portion 112 and alignment (e.g., along the angled mating surface 320) with the outer base portion 110 (e.g., along the angled mating surface 310). In other implementations, the lid portion 130 can have other shapes, e.g., in correspondence with a shape of the base portion. In this example, the lid portion 130 can also include a second side (e.g., the side that is upward facing in FIG. 1 and downward facing in FIG. 3) that is at least partially closed or, as illustrated in FIGS. 1 and 3, completely closed.

As with the base portion of the integrated VR headset 100, the lid portion 130 can include a left side, a right side, a bottom side and a top side (e.g., with the left side and the top side not visible in FIG. 1). In the VR headset 100, the left side, the right side, the bottom side and the top side of the cover portion 110 can define the open, first side of the lid portion 130 (e.g., the upward facing side in FIG. 3), where the open, first side of the lid portion 130 is configured such that the lid portion 130 can be slidably fit over the inner base portion 112, and the angled mating surfaces 320 of the lid portion 130 can be aligned with the angled mating surfaces 310 of outer base portion 110. In such an arrangement, the lid portion 130 (e.g., an interior surface of the second side of the lid portion 130) can retain (e.g., frictionally retain, mechanically retain, etc.) the electronic device 170 in the inner base portion 112 of the integrated VR headset 100 for shipping (e.g., with the electronic device 170 in a touchscreen-up orientation) and for viewing VR content displayed by the electronic device 170 (e.g., with the electronic device 170 in a touchscreen-up orientation).

As briefly noted above, the lid portion 130 of the integrated VR headset 100 can be configured to be hingeably closed over at least a portion of the inner base portion 112. In such an arrangement, at least a portion of the inner base portion 112 of the integrated VR headset 100 can be disposed within the lid portion 130, such that the electronic device 170 is retained (frictionally, mechanically, etc.) between a ledge (e.g., a ledge 850, shown in FIG. 8A) defined by the inner base portion 112 and an interior surface of the lid portion 130 (e.g., the upward facing surface of the second side of the lid portion 130 as shown in FIG. 3).

Figure 4A:
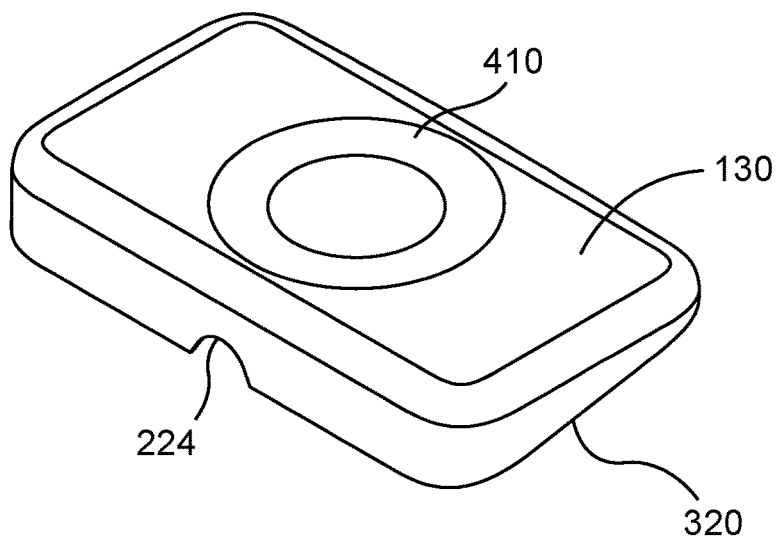
FIG. 4A is a diagram illustrating a perspective view of a lid portion of the integrated shipping container and VR headset of FIG. 1, according to an implementation.
Figure 4B:
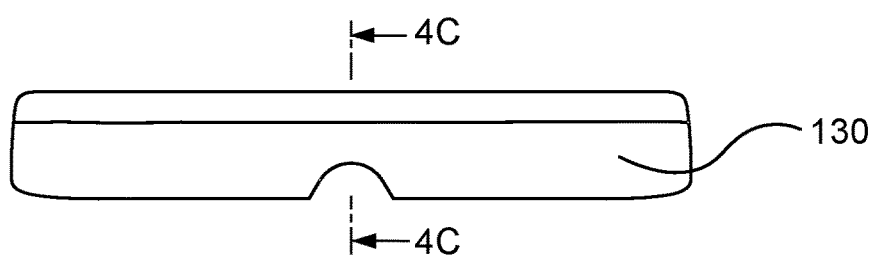
FIG. 4B is a diagram illustrating a bottom-side plan view of the lid portion of FIG. 4A, according to an implementation.

FIG. 4A is a diagram illustrating a perspective view of the lid portion 130 of the integrated VR headset 100 of FIG. 1, according to an implementation. As shown in FIG. 4A, the lid portion 130 can include, on its second (e.g., closed) side, a central portion 410, which can be a recessed portion and/or can be used for displaying a logo and/or branding information, such as a logo or branding information associated with a manufacturer of the electronic device 170 that is shipped in the integrated VR headset 100. FIG. 4B is a bottom-side plan view of the lid portion 130. A cross-section line 4C-4C is shown in FIG. 4B, which corresponds with the cross-sectional view of the lid portion 130 shown in FIG. 4C.

Figure 4C:
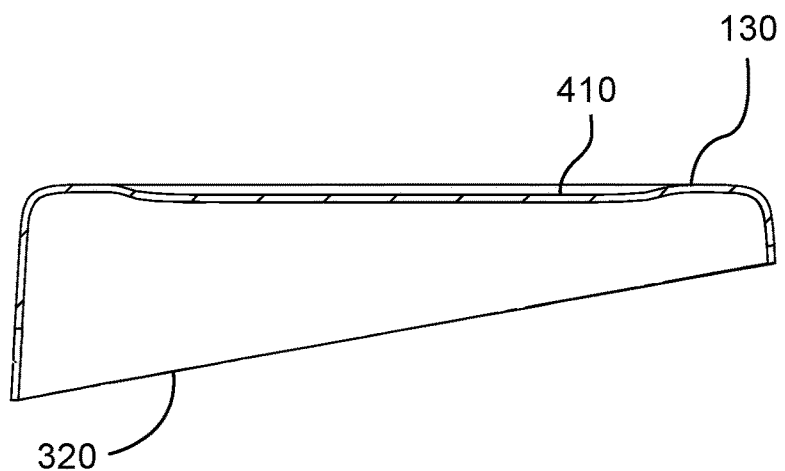
FIG. 4C is a diagram illustrating a—cross sectional view of the lid portion of FIGS. 4A and 4B along the section line 4C-4C in FIG. 4B, according to an implementation.

As illustrated in the cross-sectional view of FIG. 4C, the central portion 410 can extend into the lid portion 130 and act as a stabilization structure for the electronic device 170 when it is used to view VR content. In other words, the central portion 410 can be configured to contact the electronic device 170 when it is disposed in the inner base portion 112 of the integrated VR headset 100. In such an approach, the central portion 410, when the lid portion 130 is in its hinged closed position (as shown in FIG. 2A), can press against the electronic device 170 (e.g., a backside cover of the electronic device 170) and, in turn, press the electronic device 170 against the ledge 850 (e.g., illustrated in FIGS. 8A-8C) of the inner base portion 112, which can prevent movement of the electronic device 170 within the integrated VR headset 100 when used to view and/or interact with VR content displayed on the electronic device 170.

Figure 5A:
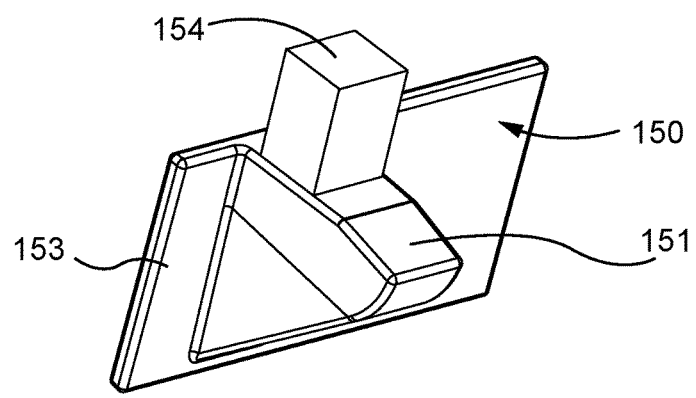
FIG. 5A is a diagram illustrating a perspective view of a button mechanism of the integrated shipping container and VR headset of FIG. 1, according to an implementation.

FIG. 5A is a diagram illustrating a perspective view of the button mechanism 150 of the integrated VR headset 100 of FIG. 1, according to an implementation. As shown in FIG. 5A, the button mechanism 150 can include a rectangular base section 153 on which the wedge 151 is disposed. The base section 153 can be used, for instance, to affix (adhere, attach, etc.) the button mechanism 150 with the inner base portion 112 and/or with the outer base portion 110 of the integrated VR headset 100, such as was previously described. Depending on the embodiment, the wedge 151 can be formed of a conductive material that is in electrical contact with (electrically coupled with, coupled with, and so forth) the conductive tape 152 (not shown in FIG. 5A), or can be formed of a non-conductive material and the conductive tape 152 can extend from the button aperture 210 of outer base portion 110 onto the wedge 151 and be disposed on a surface of the wedge 151 that contacts the touchscreen of the electronic device 171 when the button mechanism is depressed, e.g., by a user.

As also shown in FIG. 5A, the block 154 can be disposed on a top surface of the wedge 151. As noted above, the block 154 (which can be formed from a number of appropriate materials) can function as a stop for the button mechanism 150, as well as provide a spring force (due to resiliency of the block 154) to maintain (return) the button mechanism 150 to its biased position (e.g., with the wedge 151 not in contact with a touchscreen of an associated electronic device). In such an approach, the front surface of the block 154 in FIG. 5B, when the button mechanism of the integrated VR headset 100 is depressed, may be compressed against the inner base portion 112 and, as a result, prevent a user from exerting excessive force (through the button mechanism 150) on the touchscreen of the electronic device 170 (thus preventing damage to the touchscreen), and also return the button mechanism 150 to its biased (normal) position once the button mechanism 150 is no longer depressed.

Figure 5B:
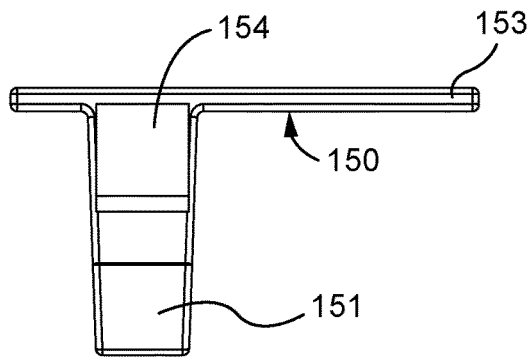
FIG. 5B is a diagram illustrating a top-side plan view of the button mechanism of FIG. 5A, according to an implementation.
Figure 5C:
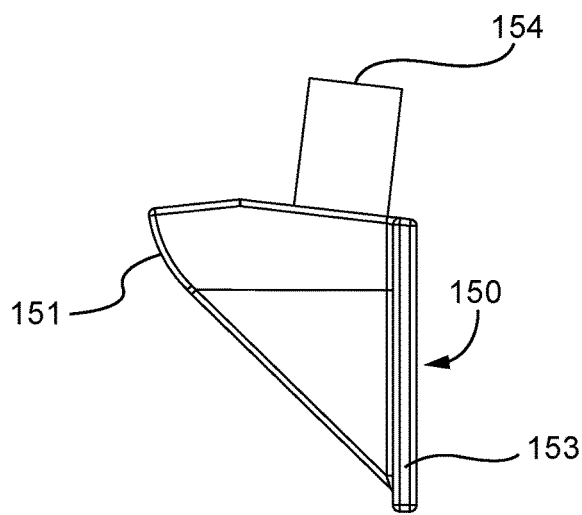
FIG. 5C is a diagram illustrating a right-side plan view of the button mechanism of FIG. 5A, according to an implementation.

FIG. 5B is a diagram illustrating a top-side plan view of the button mechanism 150 of FIG. 5A, and FIG. 5C is a right-side plan view of the button mechanism 150, according to an implementation. The views shown in FIGS. 5B and 5C illustrate the orientation of the block 154 on the wedge 151. Depending on the particular implementation, the block 154 can be formed monolithically with the wedge 151 (and the base 153), or can be formed as a separate part and mounted (attached, affixed to, etc.) the wedge 151 in the arrangement shown in FIGS. 5A-5C. Further, the block 154, in some implementations, can be mounted to (on, etc.) the conductive tape 152. In other words, a portion of the conductive tape 152 can be disposed between the wedge 151 and the block 154.

Figure 6A:
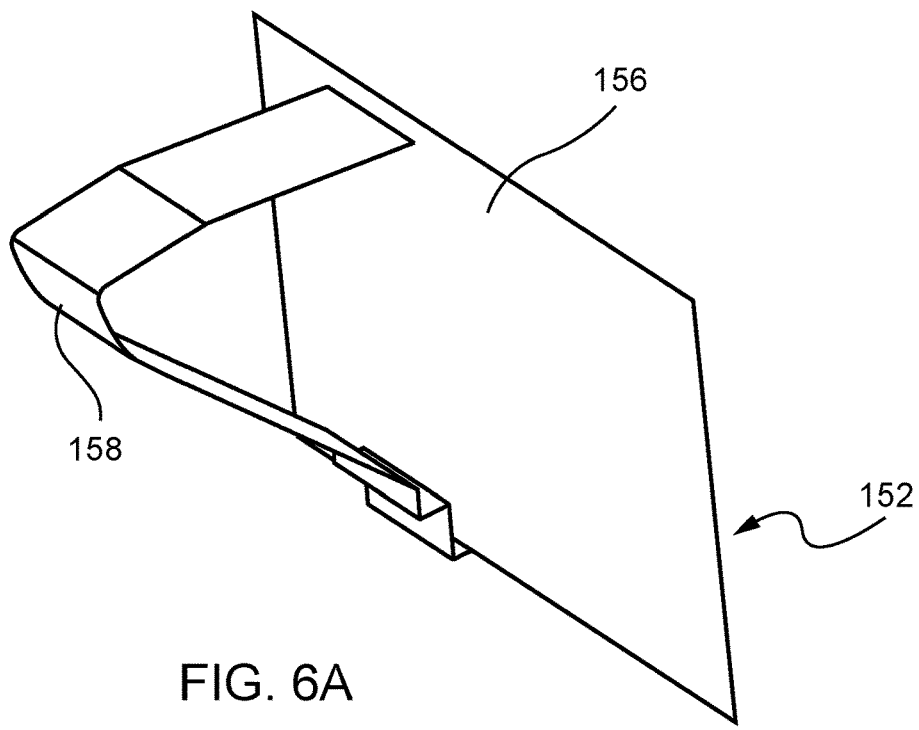
FIG. 6A is a diagram illustrating a conductive tape that can be applied to the button mechanism of FIG. 5A, according to an implementation.
Figure 6B:
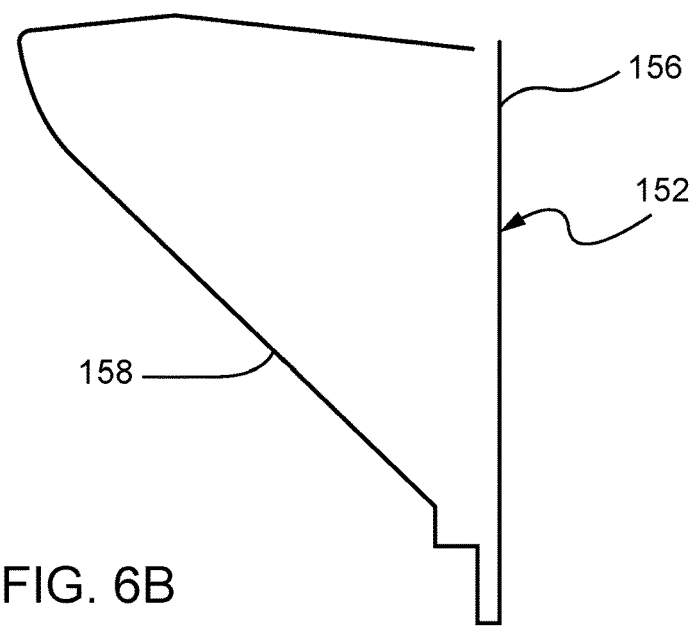
FIG. 6B is a diagram illustrating a right-side plan view of the conductive tape of FIG. 6A, according to an implementation.

FIG. 6A is a diagram illustrating an example implementation of the conductive tape 152 of FIG. 1, which can be applied to (included with, part of, and so forth) the button mechanism 150 of FIG. 5A. The conductive tape 152 shown in FIG. 6A can be formed from a continuous piece of conductive material, such as an adhesive coated conductive fabric, as one example. As shown in FIG. 6A, the conductive tape 152 can include a contact portion 156 and a wedge portion 158. The contact portion 156 of the conductive tape 152 can be, at least partially, exposed through the button aperture 210 of the outer base portion 110 (as shown in FIGS. 2A and 2B) and along (in parallel with) a backside of the base section 153 of the button mechanism 150 shown in FIG. 5A. The wedge portion 158 of the conductive tape 152 can extend around, from the backside of the button mechanism 150, onto the wedge 151, so as to provide a selective conductive path from the button aperture 210 to the touchscreen of the electronic device 170 (e.g., when the button mechanism is depressed by a user). FIG. 6B is a diagram illustrating a right-side plan view of the conductive tape 152 shown in FIG. 6A.

Figure 7A:
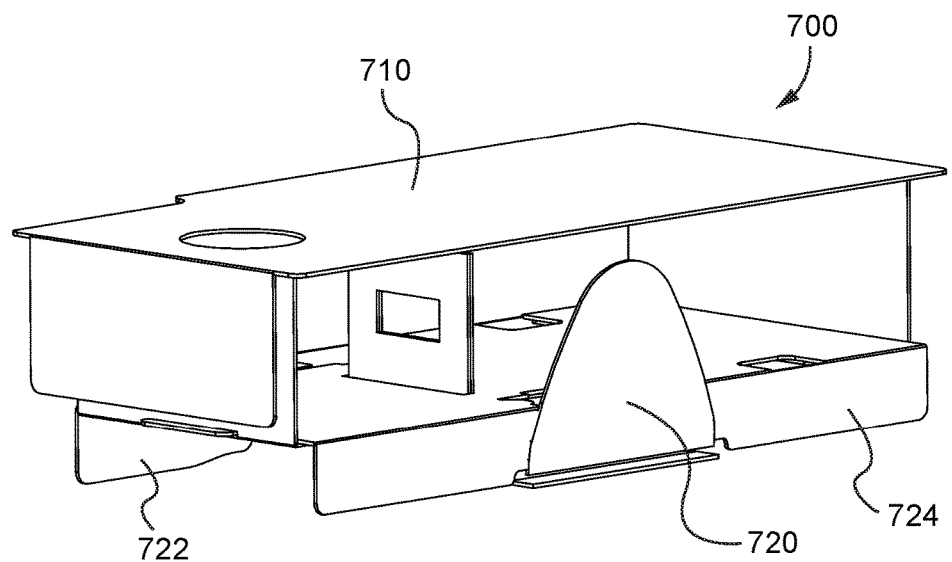
FIG. 7A is a diagram illustrating a perspective view of an accessory tray that can be used in conjunction with the integrated shipping container and VR headset of FIG. 1, according to an implementation.

FIG. 7A is a diagram illustrating a perspective view of the accessory tray 160 of FIG. 1, according to an implementation. In the embodiment shown in FIG. 7A, the accessory tray 160 can include two separate portions (pieces, parts, etc.), a first portion 710 (shown in an unfolded plan view in FIG. 7C) and a second portion 720 (shown in an unfolded plan view in FIG. 7D). As shown in FIG. 7A, the accessory tray 160 can include legs (stand-offs, etc.) 722 and 724, which, in this implementation, can be included as part of the second portion 720 of the accessory tray 160. The legs 722 and 724, when the accessory tray 160 is inserted in the inner base portion 112 of the integrated VR headset 100 (e.g., for shipping) can prevent the accessory tray 160 (and the accessory disposed therein) from contacting, and causing damage to the lenses 120.

As also shown in FIG. 7A, the second piece 720 of the accessory tray 160 can include a flap that aligns with the cutout 220 in the outer base portion 110, the cutout 222 in the inner base portion 112 and the cutout 224 in the lid portion 130, to prevent accessories disposed within the accessory tray from moving through the cutouts 220, 222 and 224 (e.g., during shipping) and possibly damaging the lenses 120.

Figure 7B:
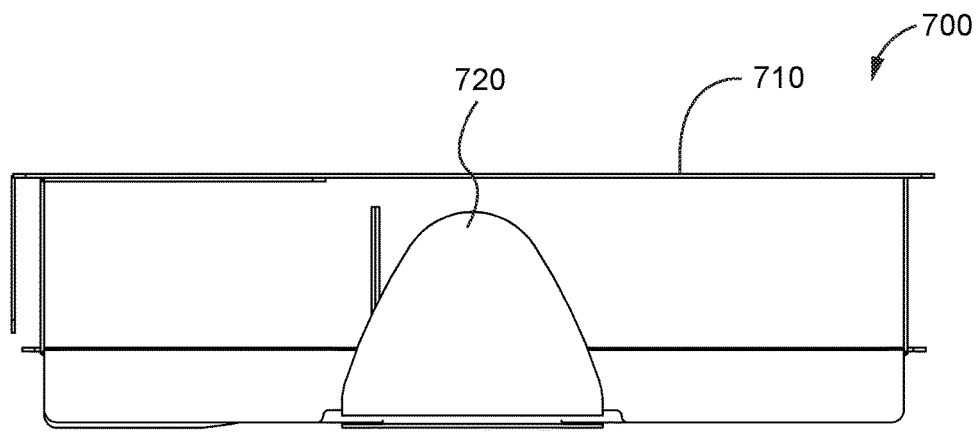
FIG. 7B is a diagram illustrating a bottom-side plan view of the accessory tray of FIG. 7A, according to an implementation.
Figure 7C:
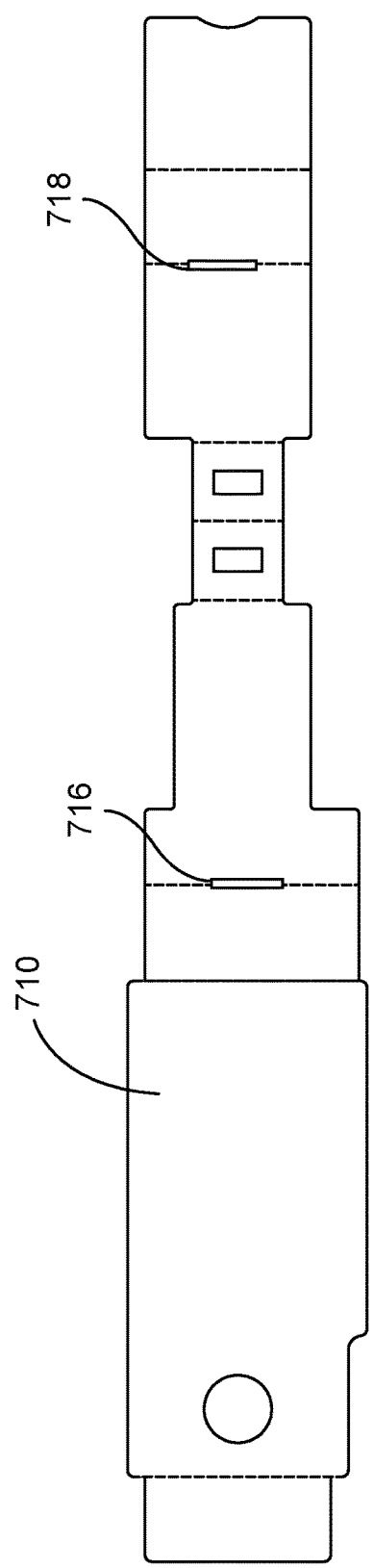
FIG. 7C is a diagram illustrating a plan view of a first portion of the accessory tray of FIG. 7A, shown in a flat, pre-folded configuration, according to an implementation.

FIG. 7B is a drawing that illustrates a bottom-side plan view of the accessory tray 160. As shown in FIGS. 7A and 7B, the accessory tray 160 can include one or more walls, where the walls of the accessory tray 160, in conjunction with one or more sides of the inner base portion 112, can prevent movement of accessories disposed within the accessory tray 160 during shipment of a corresponding electronic device to a consumer using the integrated VR headset 100.

As noted above, FIG. 7C is a diagram illustrating a plan view of the first portion 710 of the accessory tray 160 of FIG. 7A, shown in a flat, pre-folded (unfolded) configuration, according to an implementation. Similarly, FIG. 7D is a diagram illustrating a plan view of the second portion 720 of the accessory tray 160 of FIG. 7A, shown in a flat, pre-folded (unfolded) configuration, according to an implementation. In this implantation, the first piece 710 and the second piece 720 can appropriately folded along the dotted lines shown in the FIGS. 7C and 7D, and the tabs 726 and 728 of the second portion 720 can be inserted into the slots 716 and 718 of the first portion 710 to form the accessory tray 160.

Figure 8A:
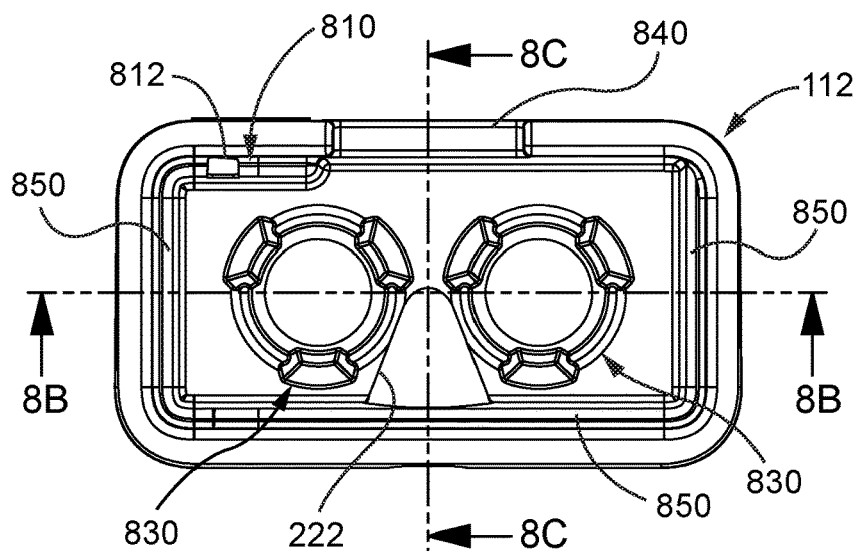
FIG. 8A is a diagram illustrating a plan view of an inner portion of a base portion of the integrated shipping container and VR headset of FIG. 1, according to an implementation.
Figure 8B:
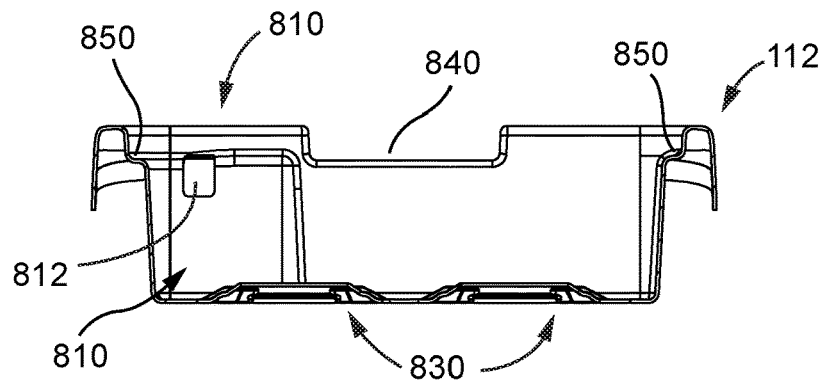
FIG. 8B is a diagram illustrating a cross-sectional view of the inner portion of FIG. 8A along section line 8B-8B, according to an implementation.
Figure 8C:
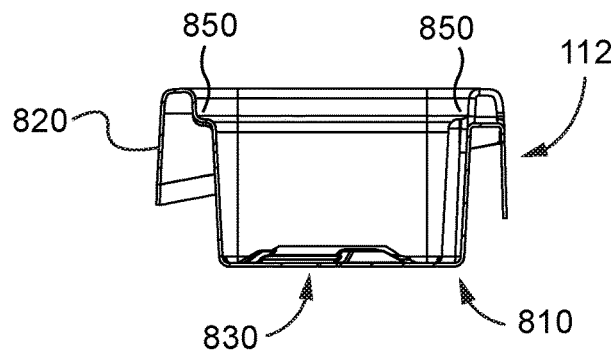
FIG. 8C is a diagram illustrating a cross-sectional view of the inner portion of FIG. 8A along section line 8C-8C, according to an implementation.

FIG. 8A is a diagram illustrating a plan view of the inner base portion 112 of the base portion of the integrated VR headset 100 of FIG. 1, according to an implementation. FIG. 8B is a diagram illustrating a cross-sectional view of the inner base portion 112 along the section line 8B-8B in FIG. 8A. FIG. 8C is a diagram illustrating a cross-sectional view of the inner base portion 112 along the section line 8B-8B in FIG. 8A.

As illustrated in FIGS. 8A-8C, the inner base portion 112 can include a button recess 810, where the button mechanism 150 of FIGS. 5A-5C can be affixed, or disposed adjacent to. In other words, the button mechanism 150 can be fixedly disposed between the button recess 810 and the outer base layer 110, such that the wedge 151 of the button mechanism 150 extends through an aperture 812 defined in the button recess 810. As also shown in FIGS. 8A-8C, the inner base portion 112 can include a pair of lens enclosures 830 (e.g., that correspond with lens enclosure of the outer base portion 110) and define lens apertures for the lenses 120.

In the implementation of FIGS. 8A-8C (as well as FIGS. 8D-8F), the inner base portion 112 can also include the hinge recess 840 (referenced with respect to FIG. 3 above). The hinge recess 840 can define an interface point for the first hinge portion 140 and the second hinge portion 142 of FIG. 1. In some implementations, one or more portions of a hinge structure of the integrated VR headset 100 can be coupled with (attached to, affixed with, etc.) the hinge recess 840 to hingeably couple the lid portion 130 of the integrated VR headset 110 with its base portion.

As also shown in FIGS. 8A-8C, the inner base portion 112 can include (define, etc.) a ledge 850 that is disposed around at least a portion of an interior perimeter of the inner base portion 112. The ledge 850 can be configured to physically support the electronic device 170 (e.g., retain the electronic device 170 near the open, first side of the base portion of the integrated VR headset 100) when the electronic device 170 is inserted in the integrated VR headset 100. In other words, the electronic device 170 can rest, set, etc., on the ledge 850, so as to position/secure the electronic device 170, in conjunction with the lid portion 130 (in its hinged-close position), in the integrated VR headset 100 for shipping (e.g., with the electronic device 170 in a touchscreen-up orientation) and for viewing VR content displayed on electronic device 170 (e.g., with the electronic device 170 in a touchscreen-down orientation). In this implementation, the ledge 850 can be monolithically formed as part of the inner base portion 112. In other implementations, the ledge 850 can be formed in other ways.

Figure 8D:
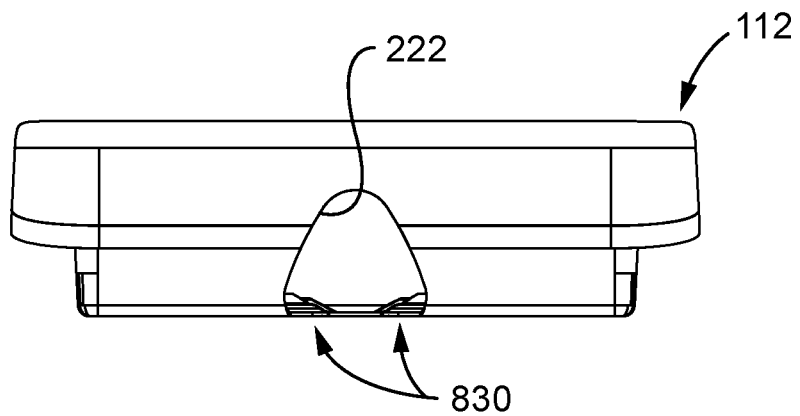
FIG. 8D is a diagram illustrating a bottom-side plan view of the inner portion of FIG. 8A, according to an implementation.
Figure 8E:
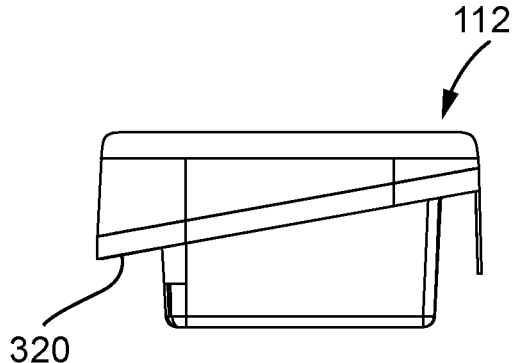
FIG. 8E is a diagram illustrating a left-side plan view of the inner portion of FIG. 8A, according to an implementation.
Figure 8F:
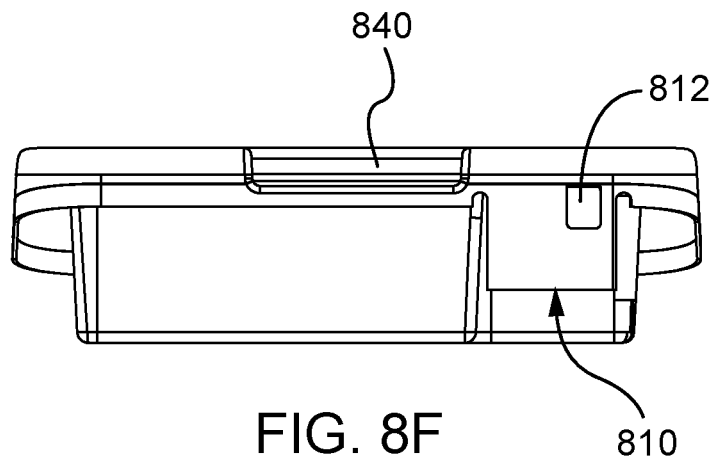
FIG. 8F is a diagram illustrating a top-side plan view of the inner portion of FIG. 8A, according to an implementation.

FIG. 8D is a diagram illustrating a bottom-side plan view of the inner base portion 112 of FIG. 8A-8C, according to an implementation. FIG. 8D illustrates the arrangement of the lens enclosures 830 with respect to the nose cutout 222 in the inner base portion 112. FIG. 8E is a diagram illustrating a left-side plan view of the inner base portion 112 of FIGS. 8A-8C, according to an implementation. FIG. 8E shows the arrangement of the angled mating surface (edge) 320 of the inner base portion 112. FIG. 8F is a diagram illustrating a top-side plan view of the inner base portion of FIG. 8A-8C, according to an implementation. FIG. 8F illustrates the arrangement of the button recess 810, the aperture 812 (for receiving the wedge 151 of the button mechanism 150) and the hinge recess 840 on the topside of the inner base portion 112.

Figure 9A:
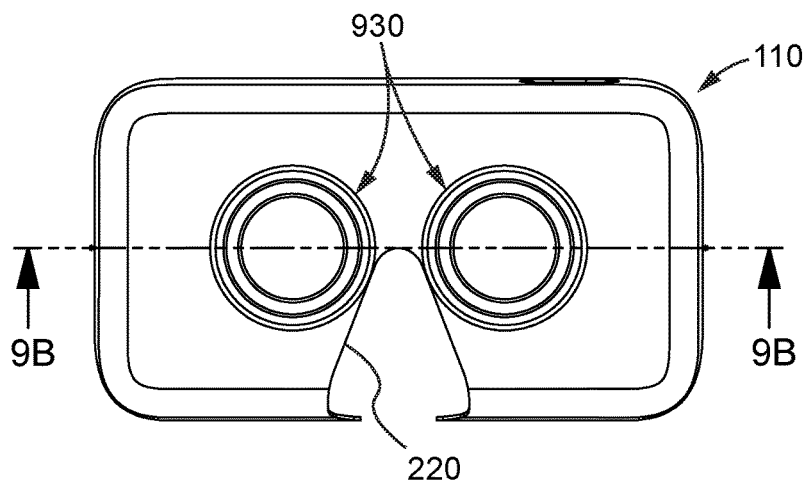
FIG. 9A is a diagram illustrating a plan view of an outer portion of the base portion of the integrated shipping container and VR headset of FIG. 1, according to an implementation.
Figure 9B:
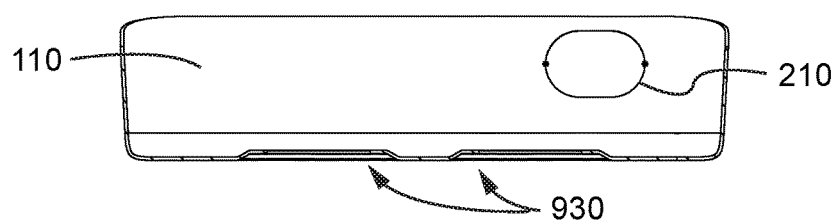
FIG. 9B is a diagram illustrating a top-side plan view of the outer portion of FIG. 9A, according to an implementation.

FIG. 9A is a diagram illustrating a plan view of the outer base portion 110 of the base portion of the integrated VR headset 100 of FIG. 1, according to an implementation. FIG. 9B is a diagram illustrating a cross-sectional view of the outer base portion 110 along the section line 9B-9B in FIG. 9A As illustrated in FIGS. 9A-9B, the outer base portion 110 can include the button aperture 210, where the button mechanism 150 of FIGS. 5A-5C can be exposed for depression by a user, as described herein. As also shown in FIGS. 9A-9B, the outer base portion 110 can include a pair of lens enclosures 930 (e.g., that correspond with lens enclosure 830 of the inner base portion 112) and define lens apertures for the lenses 120.

Figure 9C:
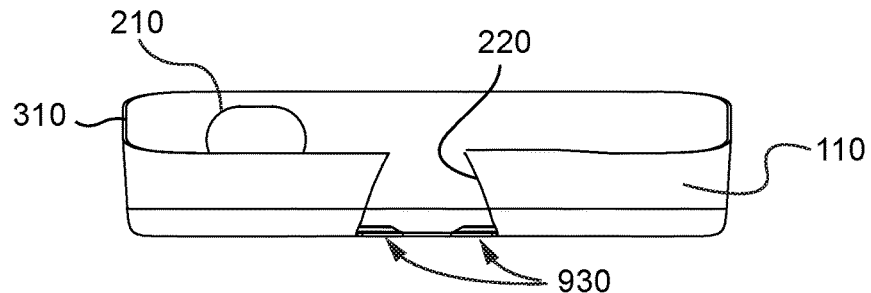
FIG. 9C is a diagram illustrating a bottom-side plan view of the outer portion of FIG. 9A, according to an implementation.
Figure 9D:
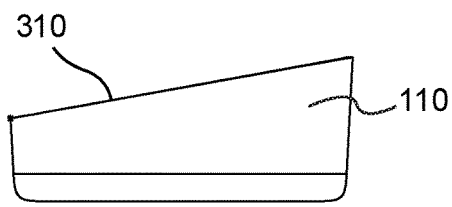
FIG. 9D is a diagram illustrating a left-side plan view of the inner portion of FIG. 9A, according to an implementation.

FIG. 9C is a diagram illustrating a bottom-side plan view of the outer base portion 110 of FIG. 9A, according to an implementation. FIG. 9C illustrates the arrangement of the lens enclosures 930 with respect to the nose cutout 220, and also illustrates the arrangement of the button aperture 210 with respect to the nose cutout 220 and the lens enclosures 930. FIG. 9D is a diagram illustrating a left-side plan view of the outer base portion 110 of FIG. 9A, according to an implementation. FIG. 9D shows the arrangement of the angled mating surface (edge) 310 of the outer base portion 110.

Figure 10:
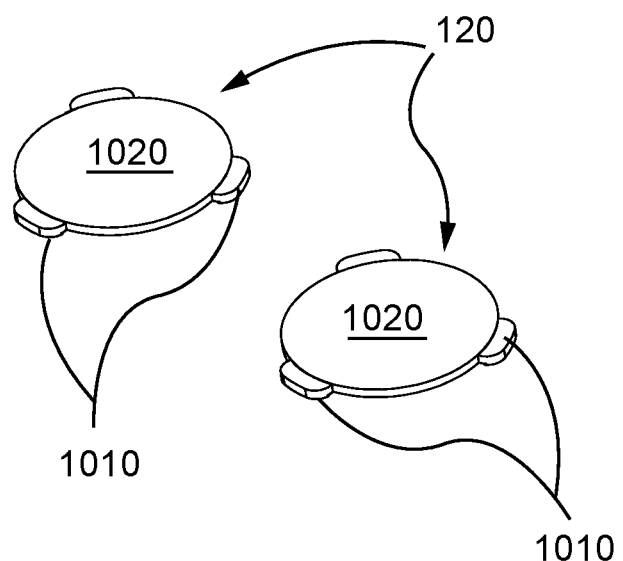
FIG. 10 is a diagram illustrating a perspective view of a pair of lenses of the integrated shipping container and VR headset of FIG. 1, according to an implementation.

FIG. 10 is a diagram illustrating a perspective view of the lenses 120 of the integrated VR headset 100 of FIG. 1, according to an implementation. As shown in FIG. 10, the lenses 120 each include a plurality of retention tabs 1010 and an optical portion 1020. Each of the lenses 120 can be mounted in a respective lens aperture, of the lens apertures defined by the lens enclosures 830 and 930 of the inner base portion 112 and the outer base portion 110. In such an approach, the retention tabs 1010 of the lenses 120 can engage with the lens enclosures 830 and 930, and/or with the adhesive layer 114 to retain the lenses 120 in fixed positions within the lens apertures of the base portion of the integrated VR headset 100 without occluding the optical portions 1020 of the lenses 120. In other words, in such an approach, the optical portions 1020 of the lenses 120 can be disposed with the lens apertures defined by the lens enclosures 830 and 930, while the retention tabs 1010 are disposed between (e.g., not visible) the lens enclosures 830 and 930 such that the lenses are held in fixed positions in the base portion of the integrated VR headset 100.

Figure 11:
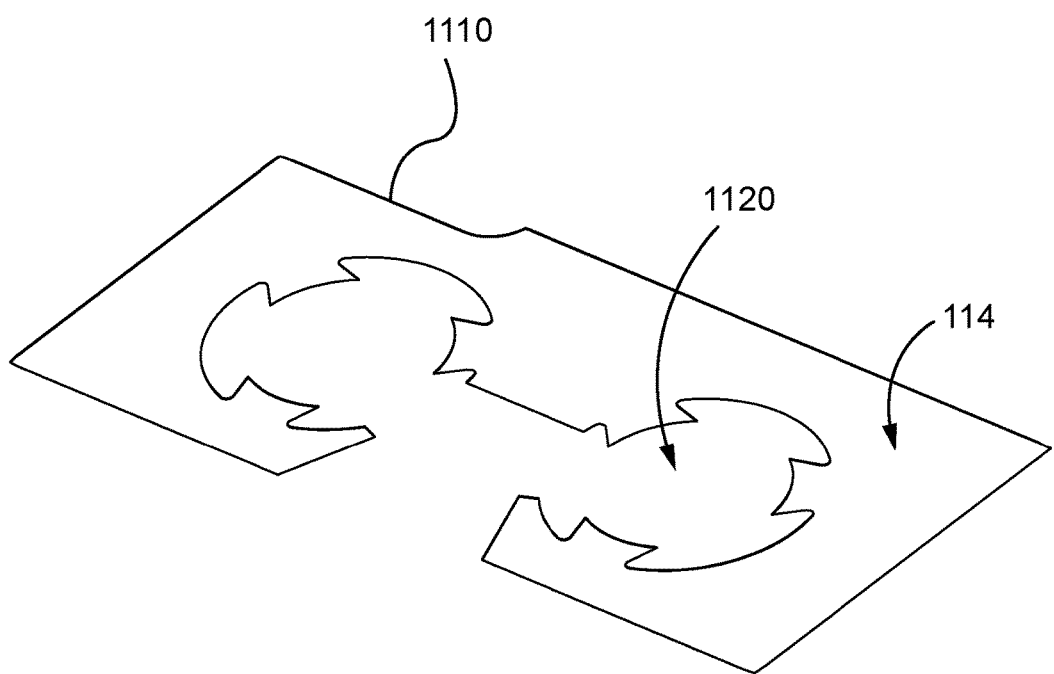
FIG. 11 is a diagram illustrating a perspective view of an adhesive layer for affixing the inner portion of FIG. 8A with the outer portion 9A, according to an implementation.

FIG. 11 is a diagram illustrating a perspective view of the adhesive layer 114 for affixing the inner base portion 112 of FIG. 8A with the outer base portion 110 of 9A to form the base portion of the integrated VR headset 100 of FIG. 1, according to an implementation. As shown in FIG. 11, the adhesive layer 114 can include a notch 1110 that corresponds with the button recess 810 of the inner base portion 112 of FIG. 8A-8F. As shown in FIG. 11, the adhesive layer 114 can also include a cutout 1120 that corresponds with the lens apertures of the inner base portion 112 and the outer base portion, as well as the nose cutout 220 in the outer base portion 110 and the nose cutout 222 in the inner base portion 110. As discussed above, the adhesive layer 114 can take a number of forms. For instance, the adhesive layer 114 can include an adhesive coated plastic sheet, tape, an adhesive coated fabric, and so forth. As also discussed above, in other implementations, other approaches can be used to affix the inner base portion 110 with the outer base portion, such as glue, epoxy, hook and loop, etc.

In an implementation, an apparatus can include a base portion that is open on a first side, and a first lens and a second lens disposed within a second side of the base portion. The apparatus can also include a ledge disposed around at least a portion of an interior perimeter of the base portion, the ledge being configured to physically support an electronic device inserted from the first side of the base portion. The apparatus can further include a lid portion that is open on a first side and closed on a second side, and a hinge that couples the base portion with the lid portion. The base portion, the lid portion and the hinge can be configured such that the base portion and the lid portion are hingeably moveable, relative to one another, between an open position and a closed position.

Implementations can include one or more of the following features. For example, the base portion and the lid portion can have corresponding angled mating surfaces. The base portion can include an outer base portion having a first lens aperture, a second lens aperture and an inner base portion. The inner base portion can include a first lens aperture aligned with the first lens aperture of the outer base portion and a second lens aperture aligned with the second lens aperture of the outer base portion. The base portion can include an adhesive layer affixing the inner base portion to the outer base portion. The inner base portion can be at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion. The first lens and the second lens can each include a plurality of tabs configured to fixedly retain the first lens and the second lens between the inner base portion and the outer base portion.

The base portion and the lid portion can have a cutout defined therein. The cutout can be configured for placement over a nose of a user.

The apparatus can include a button mechanism affixed with the base portion. The button mechanism can be configured to selectably interact with a touchscreen of the electronic device. The base portion can include an aperture that is associated with the button mechanism. A portion of the button mechanism can be exposed through the aperture. The button mechanism can include a conductive material.

The base portion can include an inner base portion and an outer base portion. The button mechanism can be fixedly retained between the inner base portion and the outer base portion. The inner base portion can include a cutout configured to receive a portion of the button mechanism. The outer base portion can include an aperture that is associated with the button mechanism. A portion of the button mechanism can be exposed through the aperture.

The base portion can include an inner base portion and an outer base portion. The inner base portion can include a recessed portion. The button mechanism can be fixedly attached to the recessed portion, such that the button mechanism is fixedly retained between the inner base portion and the outer base portion. The inner base portion can include a cutout configured to receive a portion of the button mechanism.

The hinge can include a first hinge portion and a second hinge portion. The first hinge portion can be coupled with at least one interior surface of the apparatus. The second hinge portion can be coupled with at least one exterior surface of the apparatus.

In an implementation, an article of manufacture can include a base portion that is open on a first side, and a first lens and a second lens disposed within a second side of the base portion. The article can also include a ledge disposed around at least a portion of an interior perimeter of the base portion. The ledge can be configured to physically support an electronic device inserted from the first side of the base portion. The article can also include a lid portion that is open on a first side and closed on a second side. The article can also include a hinge that couples the base portion with the lid portion. The base portion, the lid portion and the hinge can be configured such that the base portion and the lid portion are hingeably moveable, relative to one another, between an open position and a closed position. The article can also include a sleeve configured to slidably fit over the base portion and the lid portion when in the closed position. The article can further include a tray that is configured to be placed within the base portion. The tray can include a plurality of legs configured to prevent physical contact between the tray and the first lens and the second lens.

Implementations can include one or more of the following features. For example, the tray can be configured to contain at least one accessory for the electronic device. The base portion and the lid portion can have corresponding angled mating surfaces.

The base portion can include an outer base portion and an inner base portion. The outer base portion can have a first lens aperture and a second lens aperture. The inner base portion can have a first lens aperture aligned with the first lens aperture of the outer base portion and a second lens aperture aligned with the second lens aperture of the outer base portion. The base portion can include an adhesive layer affixing the inner base portion to the outer base portion, the inner base portion being at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion.

The base portion and the lid portion can have a cutout defined therein. The cutout can be configured for placement over a nose of a user.

The article can include a button mechanism affixed with the base portion. The button mechanism can be configured to selectably interact with a touchscreen of the electronic device.

The hinge can include a first hinge portion and a second hinge portion. The first hinge portion can be coupled with at least one interior surface of the apparatus. The second hinge portion can be coupled with at least one exterior surface of the apparatus.

In a general aspect, an apparatus can include a base portion that is open on a first side, and a first lens and a second lens disposed within a second side of the base portion. The apparatus can also include a ledge disposed around at least a portion of an interior perimeter of the base portion, the ledge being configured to physically support an electronic device inserted from the first side of the base portion. The apparatus can further include a lid portion that is open on a first side and closed on a second side, and a hinge that couples the base portion with the lid portion. The base portion, the lid portion and the hinge can be configured such that the base portion and the lid portion are hingeably moveable, relative to one another, between an open position and a closed position.

Implementations can include one or more of the following features. For example, the base portion and the lid portion can have corresponding angled mating surfaces. The base portion can include an outer base portion having a first lens aperture, a second lens aperture and an inner base portion. The inner base portion can include a first lens aperture aligned with the first lens aperture of the outer base portion and a second lens aperture aligned with the second lens aperture of the outer base portion. The base portion can include an adhesive layer affixing the inner base portion to the outer base portion. The inner base portion can be at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion. The first lens and the second lens can each include a plurality of tabs configured to fixedly retain the first lens and the second lens between the inner base portion and the outer base portion.

The base portion and the lid portion can have a cutout defined therein. The cutout can be configured for placement over a nose of a user.

The apparatus can include a button mechanism affixed with the base portion. The button mechanism can be configured to selectably interact with a touchscreen of the electronic device. The base portion can include an aperture that is associated with the button mechanism. A portion of the button mechanism can be exposed through the aperture. The button mechanism can include a conductive material.

The base portion can include an inner base portion and an outer base portion. The button mechanism can be fixedly retained between the inner base portion and the outer base portion. The inner base portion can include a cutout configured to receive a portion of the button mechanism. The outer base portion can include an aperture that is associated with the button mechanism. A portion of the button mechanism can be exposed through the aperture.

The base portion can include an inner base portion and an outer base portion. The inner base portion can include a recessed portion. The button mechanism can be fixedly attached to the recessed portion, such that the button mechanism is fixedly retained between the inner base portion and the outer base portion. The inner base portion can include a cutout configured to receive a portion of the button mechanism.

The hinge can include a first hinge portion and a second hinge portion. The first hinge portion can be coupled with at least one interior surface of the apparatus. The second hinge portion can be coupled with at least one exterior surface of the apparatus.

In another general aspect, an article of manufacture can include a base portion that is open on a first side, and a first lens and a second lens disposed within a second side of the base portion. The article can also include a ledge disposed around at least a portion of an interior perimeter of the base portion. The ledge can be configured to physically support an electronic device inserted from the first side of the base portion. The article can also include a lid portion that is open on a first side and closed on a second side. The article can also include a hinge that couples the base portion with the lid portion. The base portion, the lid portion and the hinge can be configured such that the base portion and the lid portion are hingeably moveable, relative to one another, between an open position and a closed position. The article can also include a sleeve configured to slidably fit over the base portion and the lid portion when in the closed position. The article can further include a tray that is configured to be placed within the base portion. The tray can include a plurality of legs configured to prevent physical contact between the tray and the first lens and the second lens.

Implementations can include one or more of the following features. For example, the tray can be configured to contain at least one accessory for the electronic device. The base portion and the lid portion can have corresponding angled mating surfaces.

The base portion can include an outer base portion and an inner base portion. The outer base portion can have a first lens aperture and a second lens aperture. The inner base portion can have a first lens aperture aligned with the first lens aperture of the outer base portion and a second lens aperture aligned with the second lens aperture of the outer base portion. The base portion can include an adhesive layer affixing the inner base portion to the outer base portion, the inner base portion being at least partially disposed within the outer base portion.

The first lens and the second lens can be fixedly retained between the inner base portion and the outer base portion. An optical portion of the first lens can be disposed within the first lens aperture of the inner base portion and the first lens aperture of the outer base portion. An optical portion of the second lens can be disposed within the second lens aperture of the inner base portion and the second lens aperture of the outer base portion.

The base portion and the lid portion can have a cutout defined therein. The cutout can be configured for placement over a nose of a user.

The article can include a button mechanism affixed with the base portion. The button mechanism can be configured to selectably interact with a touchscreen of the electronic device.

The hinge can include a first hinge portion and a second hinge portion. The first hinge portion can be coupled with at least one interior surface of the apparatus. The second hinge portion can be coupled with at least one exterior surface of the apparatus.

Figure 12:
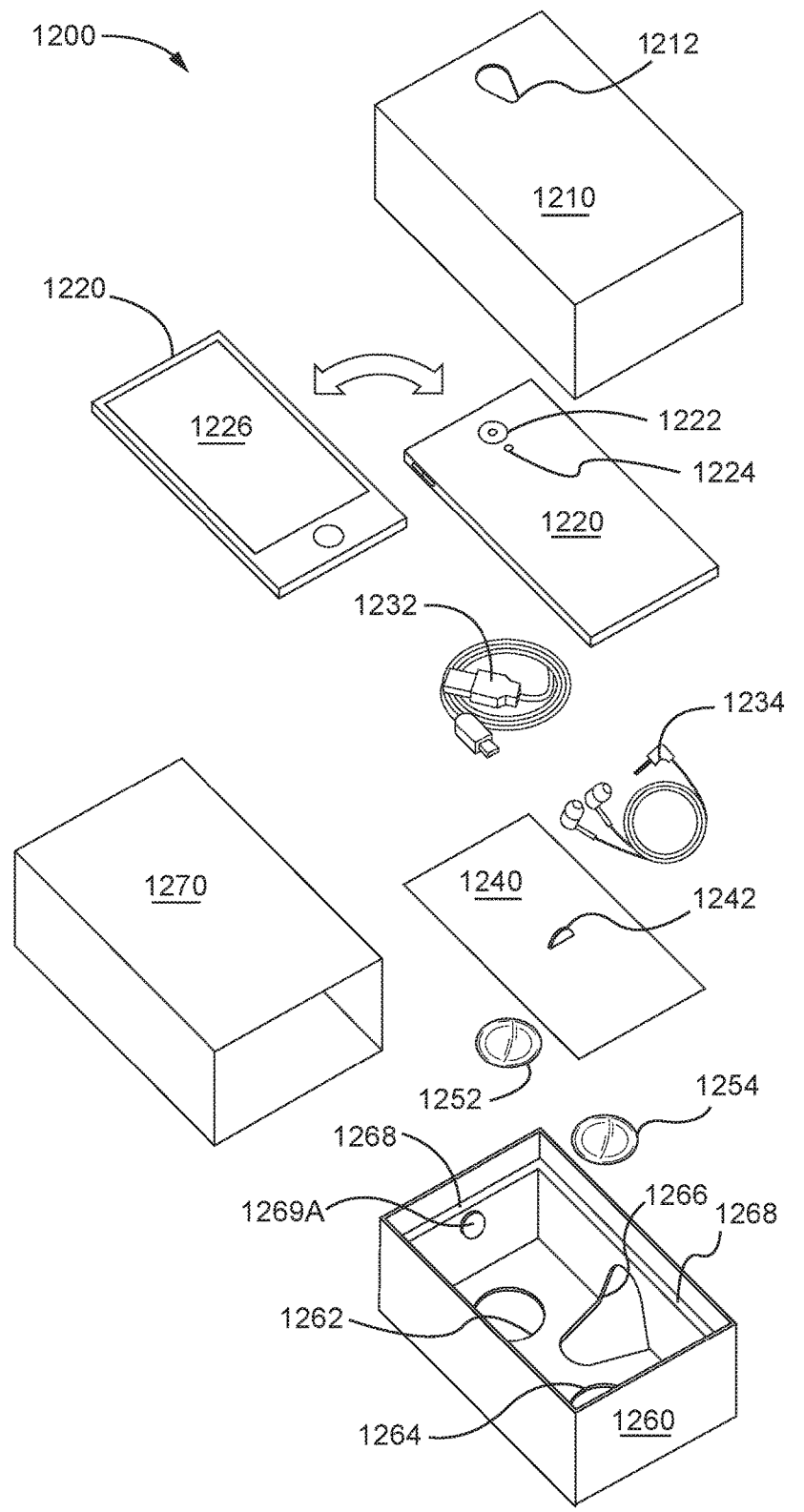
FIG. 12 is a drawing illustrating an exploded, perspective view of an integrated mobile device shipping container (packaging) and virtual reality (VR) headset, according to an implementation.

FIG. 12 is a drawing illustrating an exploded, perspective view of an integrated mobile device shipping container (packaging) and virtual reality (VR) headset 1200, according to an implementation. In FIG. 12, the integrated shipping container and VR headset 1200 is illustrated with elements that may be included when using the integrated shipping container and VR headset 1200 is used as a shipping container (e.g., commercial packaging). As shown, in FIG. 12, the integrated shipping container and VR headset 1200, in this implementation, can include a cover portion 1210, a protective liner 1240, a goggle portion 1260 (in which lenses 1252 and 1254 are affixed or mounted) and a sleeve (outer sleeve) 1270. As also illustrated in FIG. 12, the integrated shipping container and VR headset 1200 may be used to ship an electronic device 1220 (such as a smartphone, tablet, or the like) and accessories for the electronic device 1220 to a consumer. As shown in FIG. 12, such accessories can include a Universal Serial Bus (USB) charging cable 1232 and a headset 1234. It will be appreciated that, in other implementations, the integrated shipping container and VR headset 1200 can have other configurations and can be used to ship different components than those shown in and/or described with respect to FIG. 12.

In some implementations, the integrated shipping container and VR headset 1200 can include a near-field communications (NFC) tag (not shown). For instance, such an NFC tag can take the form of an adhesive backed tag or sticker that is affixed to, for example, the cover portion 1210 of the integrated shipping container and VR headset 1200. Such an NFC tag can be used to identify the integrated VR headset 1200 to the electronic device 1220 when the electronic device 1220 is inserted in the integrated VR headset 1200.

Identification of the integrated VR headset 1200 by the electronic device 1220 using such an NFC tag may allow the electronic device 1220 to determine, for instance, that the integrated VR headset 1200 corresponds the with electronic device 1220 (e.g., is designed specifically for the electronic device). In other implementations, such an NFC tag can be used to allow for a different electronic device (e.g., one not shipped in the integrated shipping container and VR headset 1200 and for which the integrated VR headset 1200 is not specifically designed) to determine a number of characteristics about the VR headset, such as a focal length of the lenses 1252 and 1254, physical dimensions of the integrated VR headset 1200, etc. Other electronic devices (e.g., for which the integrated VR headset 1200 is not specifically designed for) may use such characteristics of the integrated VR headset 1200 (e.g., determined from an NFC tag) to modify how those devices render visual VR content (e.g., to improve a user experience).

In other implementations, a 3D visual token (not shown) can be included as an additional accessory (e.g., along with the USB cable 1232 and the headset 1234) when shipping the electronic device 1220 to a consumer using the integrated shipping container and VR headset 1200. Such a 3D token can be used in conjunction with an augmented reality application (e.g., a VR application or VR content). For instance, a user can hold and/or manipulate the 3D token in front of the camera 1224 of the electronic device 1220 when it is running such an augmented reality application. In such an approach, the augmented reality application can then provide the user with a visual experience of manipulating a 3D object in VR space (e.g., based on the user's movement and/or manipulation of the 3D visual token).

As shown in FIG. 12, the electronic device 1220 can be placed in the integrated shipping container and VR headset 1200 (e.g., in the goggle portion 1260 as described herein), either with a display 1226 of the electronic device 1220 facing up (e.g., the orientation of the electronic device 1220 shown on the left in FIG. 12) or with a camera 1222 and flash 1224 facing up (e.g., the orientation of the electronic device 1220 shown on the right in FIG. 12).

In this implementation, the electronic device 1220 may be placed in the display 1226 up orientation when the integrated shipping container and VR headset 1200 is used to ship the electronic device 1220 to a consumer. Further in this implementation, the electronic device 1220 may be placed in the camera 1222 and flash 1224 up orientation (with the USB cable 1232, headphones 1234, protective liner 1240 and sleeve 1270 removed) when the integrated shipping container and VR headset 1200 is used as a VR headset (e.g., when using the electronic device 1220 to view VR images associated with executing and/or playing VR applications and/or content on the electronic device 1220).

As shown in FIG. 12, the goggle portion 1260 of the integrated shipping container and VR headset 1200 can include a rectangular chassis that is open on a first side. In other implementations, the chassis can have other configurations. For instance, the rectangular chassis of the goggle portion 1260 can include a left wall, a right wall, a bottom wall and a top wall, such as shown in FIG. 12. In such an approach, the left wall, the right wall, the bottom wall and the top wall of the goggle portion 1260 can define an open, first side of the goggle portion 1260 (e.g., the upward facing side of the goggle portion 1260 in FIG. 12).

As illustrated in FIG. 12, the goggle portion 1260 can also include a lens assembly that is disposed on a second side of the rectangular chassis of the goggle portion 1260, the second side being opposite the open first side. The lens assembly of the goggle portion 1260 can have a first aperture 1262 and a second aperture 1264 defined therein. In this implementation, a first lens (e.g., an aspherical lens) 1252 can be mounted (affixed, disposed, etc.) in the first aperture 1262 of the lens assembly. Similarly, in the integrated shipping container and VR headset 1200 of FIG. 12, a second lens (e.g., an aspherical lens) 1254 can be mounted (affixed, disposed, etc.) in the second aperture 1264 of the lens assembly.

The lenses 1252 and 1254 can be mounted in their respective apertures 1262 and 1264 using a number of possible approaches. For instance, the lens assembly can include multiple layers and the aspherical lenses 1252 and 1254 can be mounted between those layers. In such approaches, the apertures 1262 and 1264 can have retention tabs (not shown) disposed around their perimeters, where the tabs are configured to hold the lenses 1252 and 1254 in place in the apertures 1262 and 1264 without causing significant occlusion of the lenses. In other approaches, an adhesive can be used to affix the aspherical lens 1252 and 1254 in their respective apertures 1262 and 1264. In still other implementations, other techniques can be used to secure the lenses 1252 and 1254 in their respective apertures 1262 and 1264.

As also shown in FIG. 12, the goggle portion 1260 can include a cutout 1266 defined in the lens assembly and the bottom wall of the rectangular chassis of the goggle portion 1260. The cutout 1266 can be configured to allow for placement of the integrated VR headset 1200 over a nose of a user when viewing VR content displayed on the display 1226 of the electronic device 1220. As discussed below with respect to FIG. 13, the cover portion 1210 can have a cutout (cutout 1214 not shown in FIG. 12) that corresponds with the portion of the cutout 1266 defined in the bottom wall of the rectangular chassis of the goggle portion 1260.

The goggle portion 1260 of the integrated shipping container and VR headset 1200 of FIG. 1 can also include a magnet 1269A that is disposed on a wall (e.g., the left wall) of the goggle portion 1260. In this implementation, the magnet 1269A can be included in an input mechanism (e.g., a magnetic input mechanism) of the integrated VR headset 1200 that can be used to interact with VR content that is being executed or played on the electronic device 1220. Such an input mechanism is described in further detail below, e.g., with respect to FIG. 13.

As illustrated in FIG. 12, the goggle portion 1260 of the integrated shipping container and VR headset 1200 can also include a ledge 1268 that is disposed around an interior perimeter of the rectangular chassis of the goggle portion 1260. The ledge 1268 can be configured to physically support the electronic device 1220 (e.g., retain the electronic device 1220 near the open, first side of the goggle portion

1260) when the electronic device 1220 is inserted from the first (open) side of the goggle portion 1260 defined by its rectangular chassis. In other words, the electronic device 1220 can rest, set, etc., on the ledge 1268, so as to position/secure the electronic device 1220, in conjunction with the cover portion 1210, in the integrated shipping container and VR headset 1200 for shipping (e.g., with the electronic device 1220 in a display 1226 up orientation, as shown on the left in FIG. 12) and for viewing VR content displayed on the display 1226 (e.g., with the electronic device 1220 in a camera 1222 and flash 1224 up orientation, as shown on the right in FIG. 12). Example approaches for implementing such a ledge (e.g., the ledge 1268) are illustrated in the accompanying figures and described in further detail below.

The cover portion 1210 of the integrated shipping container and VR headset 1200 of FIG. 12 can also include a rectangular chassis that is open on a first side (e.g., the side that is downward facing and, therefore, not visible in FIG. 12) that facilitates is placement over the goggle portion 1260. In other implementations, the chassis of the cover portion can have other shapes, e.g., in correspondence with a shape of the chassis of the goggle portion. In this example, the cover portion 1210 can also include a second side (e.g., the side that is upward facing in FIG. 12) that is at least partially closed. The second side of the cover portion 1210 can also include an aperture 1211 that is defined therein. The aperture 1211 can be configured, oriented, located, etc., so as to allow for the camera 1222 and the flash 1224 of the electronic device 1220 to be exposed through the cover portion 1210 when the electronic device 1220 is placed on the ledge 168 with the camera 1222 and the flash 1224 facing the second side of the cover portion 1210, and the cover portion 1210 is placed over the goggle portion 1260, such as in the arrangement shown in FIG. 13.

As with the goggle portion 1260, the rectangular chassis of the cover portion 1210 of the integrated shipping container and VR headset 1200 can include a left wall, a right wall, a bottom wall and a top wall, the left wall (e.g., with the bottom wall and the right wall not visible in FIG. 12). In the integrated shipping container and VR headset 1200, left wall, the right wall, the bottom wall and the top wall of the cover portion 1210 can define the open, first side of the cover portion 1210, where the rectangular chassis and the corresponding open, first side of the cover portion 1210 are configured such that the cover portion 1210 can be slidably fit over the goggle portion 1260. In such an arrangement, the rectangular chassis of the goggle portion 1260, the ledge 1268 and an interior surface of the second side of the cover portion 1210 can retain (e.g., frictionally retain, mechanically retain, etc.) the electronic device 1220 in the integrated shipping container and VR headset 1200 for shipping (e.g., with the electronic device 1220 in a display 1226 up orientation) and for viewing VR content displayed on the display 1226 (e.g., with the electronic device 1220 in a camera 1222 and flash 1224 up orientation).

As briefly noted above, the cover portion 1210 of the integrated shipping container and VR headset 1200 can be configured to be placed (slidably fit) over the goggle 1260 portion. In such an arrangement, at least a portion of, nearly all of, or all of the goggle portion 1260 can be disposed within the cover portion 1210, such that the electronic device 1220 is retained (frictionally, mechanically, etc.) between the ledge 1268 and an interior surface of the second side (e.g., the upward facing side of the cover portion 1210 in FIG. 12) of the cover portion 1210 (e.g., the upward facing side of the cover portion 1210 in FIG. 12).

The integrated shipping container and VR headset 1200, as shown in FIG. 12, can further include the protective liner 1240. The protective liner 1240 can be configured to be placed within (inserted into, and so forth) the goggle portion 1260, so as to provide a protective cover for the lenses 1252 and 1253 and the lens assembly of the goggle portion 1260 during shipment of the electronic device 1220 using the integrated shipping container and VR headset 100. For instance, the protective cover 1240 can prevent damage to the lenses 1252 and 1254 from the USB cable 1232 and the headset 1234 (as well as any other accessories that may be included in the integrated shipping container and VR headset 1200) during shipment. As illustrated in FIG. 12, the protective liner 1240 can include a tab 1242, where the tab 1242 is configured to facilitate removal of the protective liner 1240 from the goggle portion 1260, such as when a consumer is unpacking the electronic device 1220 and its accessories, and is preparing the integrated VR headset 1200 to view VR content.

The integrated shipping container and VR headset 1200 of FIG. 12 can further include the sleeve 1270 (an outer sleeve, a protective sleeve, etc.), where the sleeve 1270 is configured to slidably fit over the goggle portion 1260 and the cover portion 1210 of the integrated shipping container and VR headset 1200 when the cover portion 1210 is placed (slidably fit) over the goggle portion 1260, such as discussed above. In such an approach, the sleeve 1270 may provide protection for the other components of the integrated shipping container and VR headset 1200 (e.g., the lenses 1252 and 1254) during shipping and handling (e.g., from a manufacturer to a consumer). In certain implementations, the sleeve 1270 can be secured to the cover portion 1210 using one or more adhesive discs or strips (e.g., tape), which can be severed and/or removed to allow the sleeve 1270 to be removed from the remainder of the integrated shipping container and VR headset 100.

Depending on the particular implementation, the cover portion 1210, the protective liner 1240, the goggle portion 1260 and the sleeve 1270 can be made of a number of different materials. The same materials can be used for each of these components of the integrated shipping container and VR headset 1200, or different materials can be used. As some example materials, the cover portion 1210, the protective liner 1240, the goggle portion 1260 and the sleeve 1270 can be formed from cardboard, fiberboard, plastic, heavy paper stock, etc. In some implementations, the cover portion 1210, the protective liner 1240, the goggle portion 1260 and the sleeve 1270 can be formed using die-cutting techniques. In other implementations, other cutting (e.g., precision cutting) techniques may be used in place of die cutting, such as laser cutting, for example.

Figure 13:
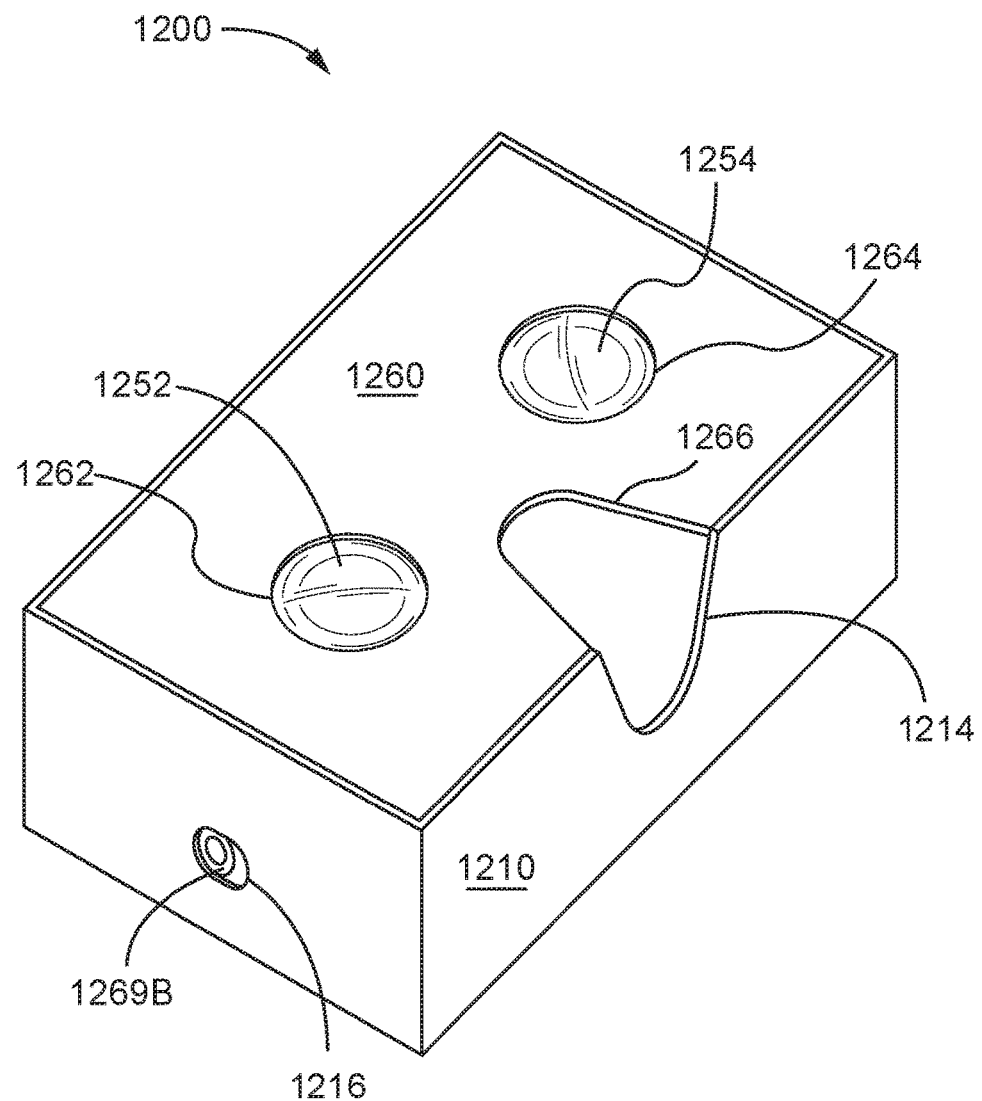
FIG. 13 is a diagram illustrating a front-side perspective view of the integrated shipping container and VR headset of FIG. 12, according to an implementation.

FIG. 13 is a diagram illustrating a front-side perspective view of the integrated shipping container and VR headset 1200 of FIG. 12, according to an implementation. As shown in FIG. 13 (as well as in FIGS. 14-18), the integrated shipping container and VR headset 1200 is illustrated in an arrangement for use as a VR headset (e.g., in conjunction with the electronic device 1220). In the perspective view of FIG. 13, the integrated VR headset 1200 is shown from a side (referred to here as the front side) that a user can place to, or near his or her face in order to view VR content displayed on the electronic device 1220, when it is inserted in the integrated VR headset 1200.

As was noted above, as illustrated in FIG. 13, the bottom wall of the rectangular chassis of the cover portion 1210 includes a cutout 1214 that corresponds with the cutout 1266 in the goggle portion 1260 of the integrated VR headset 1200. The cutouts 1214 and 1266, as shown in FIG. 13, can be complimentary (e.g., aligned with each other) and configure to facilitate placement of the integrated VR headset 1200 to a face of a user, with the cutouts 1214 and 1266 being placed over (about, around, etc.) the user's nose.

As illustrated in FIG. 13, as was discussed briefly above, the goggle portion 1260 can have a magnet 1269B disposed thereon that works, e.g., in conjunction with the magnet 1269A show in FIG. 12, as an input mechanism for the VR integrated headset 1200 to interact with VR content being executed or played by the electronic device 1220. As shown in FIG. 13, the left wall of the cover portion 1210 can have an aperture 1216 defined therein, where magnet 1269B is disposed within the aperture or slot 1216 when the cover portion 1210 is slidably fit over the goggle portion 1260, such as illustrated in FIG. 13. In other words, the aperture or slot 1216 (hereafter "slot 1216") facilitates access to the magnet 1269B of the input mechanism through the cover portion 1210.

In the integrated VR headset 1200 shown in FIG. 13, the magnet 1269B can be slid (e.g., by an external force, such as from a user's finger) within the slot 1216 (e.g., to the opposite end of the slot 1254), causing the combined magnetic field produced by the magnets 1269A and 1269B to change. The electronic device 1220 (e.g., when inserted in the integrated VR headset 1200 to view VR content) may detect this change in the combined magnetic field as an input signal that allows a user to interact with a VR application or VR content that is being executed on the electronic device 1220. When the external force on the magnet 1269B is removed, the magnetic fields of the magnets 1269A and 1269B may cause the magnet 1269B to return to its original position with the slot 1216 (e.g., as shown in FIG. 13).

As shown in FIG. 13, the magnet 1269B is disposed on the left wall of the rectangular chassis of the goggle portion 1260 and the corresponding slot 1216 is formed in the left wall of the rectangular chassis of the cover portion 1210. In other implementations, the magnets 1269A and 1269B, and the slot 1216 could be located, respectively, on a different walls (e.g., right walls, top walls or bottom walls) of the rectangular chassis of the goggle portion 1260 and the rectangular chassis of the cover portion 1210.

Figure 14:
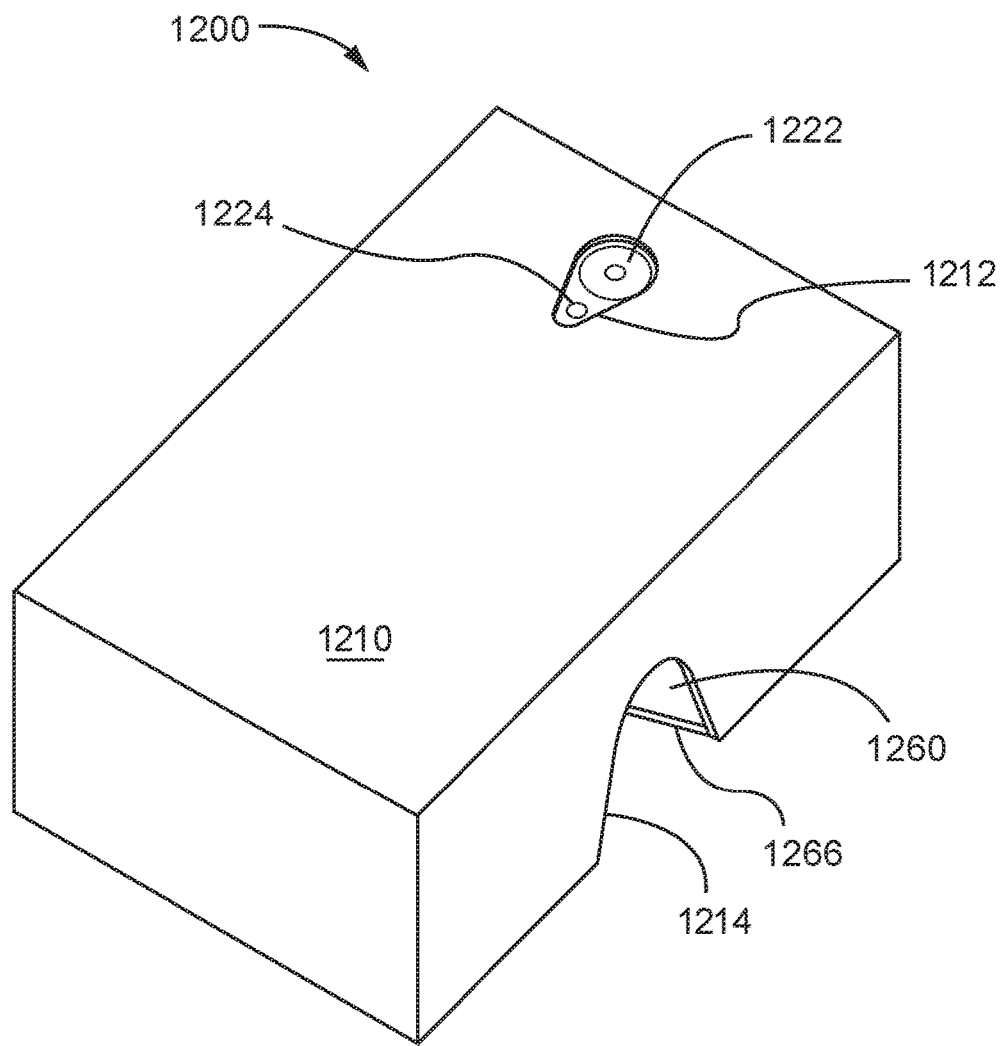
FIG. 14 is a diagram illustrating a back-side perspective view of the integrated shipping container and VR headset of FIG. 12, according to an implementation.

FIG. 14 is a diagram illustrating a back-side perspective view of the integrated shipping container and VR headset 1200 of FIG. 12, according to an implementation. As shown in FIG. 13, the integrated shipping container and VR headset 1200 is illustrated in FIG. 14 in an arrangement for use as a VR headset (e.g., in conjunction with the electronic device 1220). In the perspective view of FIG. 14, the integrated VR headset 1200 is shown rotated 180 degrees from the orientation shown in FIG. 13. As shown in FIG. 14, the camera 1222 and the flash 1224 of the electronic device 1220 are exposed (visible) through the aperture 1212 in the cover portion 1210. Such as arrangement allows for the camera 1222 and the flash 1224 to the used when a user is interacting with VR content being executed or played by the electronic device 1220. For instance, the camera 1222 and/or flash 1224 may be used to capture images and/or interact with a 3D visual token, such as described herein.

Figure 15:
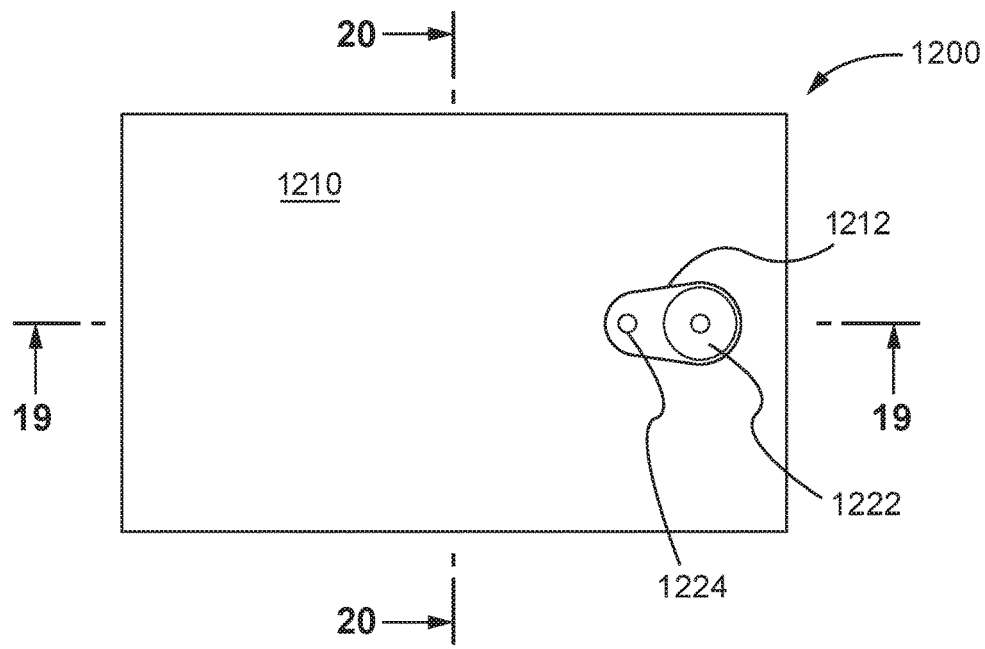
FIG. 15 is a diagram illustrating a back-side plan view of the shipping container and VR headset of FIG. 12, according to an implementation.

FIG. 15 is a diagram illustrating a back-side plan view of the integrated shipping container and VR headset 1200 of FIG. 12, according to an implementation. As in FIGS. 13 and 14, the integrated shipping container and VR headset 1200 is illustrated in FIG. 15 in an arrangement for use as a VR headset (e.g., in conjunction with the electronic device 1220). As shown in FIG. 15, the camera 1222 and the flash 1224 of the electronic device 1220 are visible (exposed) through the aperture 1212 in the cover portion 1210. FIG. 15 also illustrates section lines 19-19 and 20-20, which indicate cut lines for cross-sectional views of the cover portion 1210 that are shown, respectively, in FIGS. 19 and 20.

Figure 16:
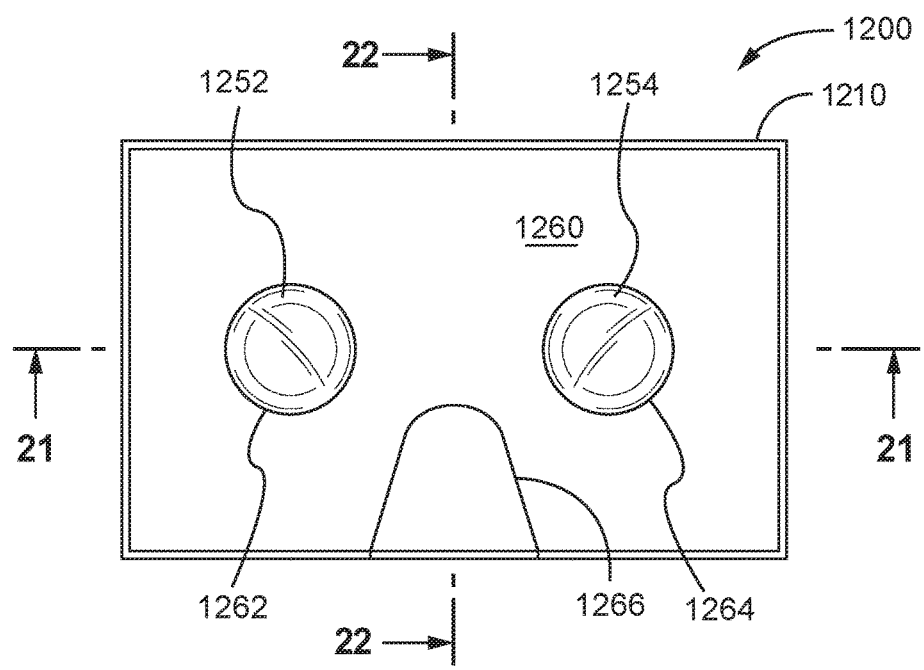
FIG. 16 is a diagram illustrating a front-side plan view of the shipping container and VR headset of FIG. 12, according to an implementation.

FIG. 16 is a diagram illustrating a front-side plan view of the integrated shipping container and VR headset 1200 of FIG. 12, according to an implementation. As in FIGS. 13-15, the integrated shipping container and VR headset 1200 is illustrated in FIG. 16 in an arrangement for use as a VR headset (e.g., in conjunction with the electronic device 1220). As shown in FIG. 15, the goggle portion 1260 can be disposed within the cover portion 1210. In other words, the cover portion 1210 can be slidably fit over the goggle portion 1260. FIG. 16 also illustrates section lines 21-21 and 22-22, which indicate cut lines for cross-sectional views of the goggle portion 1260 that are shown, respectively, in FIGS. 21 and 22.

Figure 17:
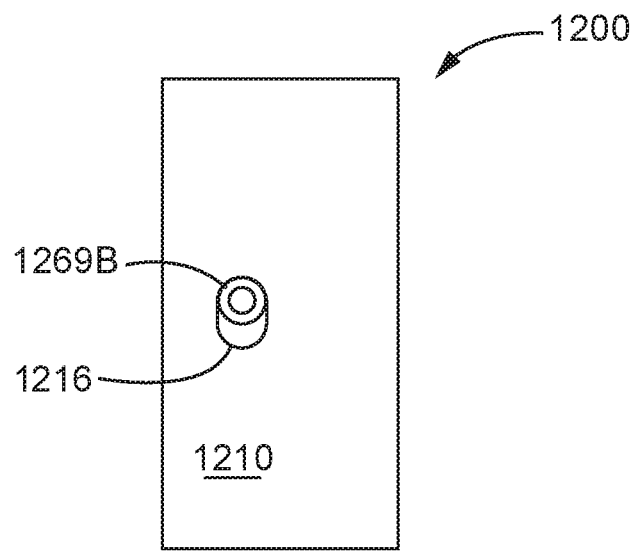
FIG. 17 is a diagram illustrating a left-side plan view of the shipping container and VR headset of FIG. 12, according to an implementation.

FIG. 17 is a diagram illustrating a left-side plan view of the integrated shipping container and VR headset 1200 of FIG. 1, according to an implementation. As in FIGS. 13-16, the integrated shipping container and VR headset 1200 is illustrated in FIG. 17 in an arrangement for use as a VR headset (e.g., in conjunction with the electronic device 1220). As shown in FIG. 17, the slot 1216 in the cover portion and the magnet 1269B disposed on the goggle portion 1260 can be arranged to be in alignment with the magnet 1269A that is disposed on an internal surface of the left wall of the rectangular chassis of the goggle portion 1260, such as illustrated in FIG. 12.

Figure 18:
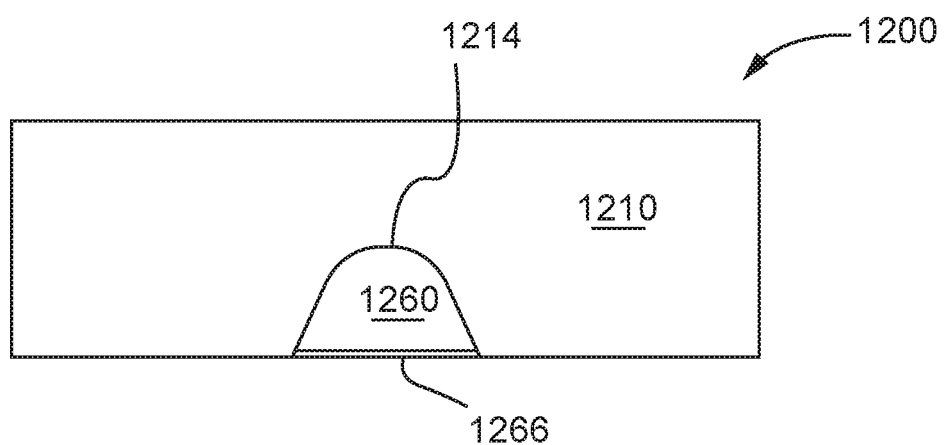
FIG. 18 is a diagram illustrating a bottom-side plan view of the shipping container and VR headset of FIG. 12, according to an implementation.

FIG. 18 is a diagram illustrating a bottom-side plan view of the integrated shipping container and VR headset 1200 of FIG. 12, according to an implementation. As in FIGS. 13-17, the integrated shipping container and VR headset 1200 is illustrated in FIG. 18 in an arrangement for use as a VR headset (e.g., in conjunction with the electronic device 1220). As shown in FIG. 18, the cutouts 1214 and 1266 (e.g., for placement over a user's nose) are complimentary and aligned with each other in the corresponding parts of the cover portion 1210 and the goggle portion 1260.

Figure 19:
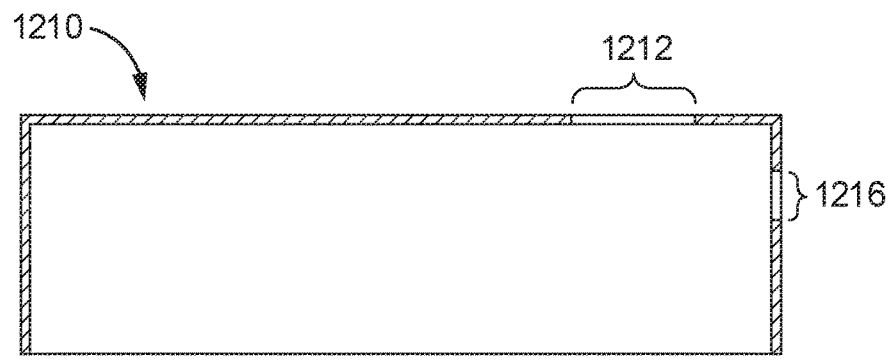
FIG. 19 is a diagram illustrating a cross-sectional view of a cover portion of the shipping container and VR headset of FIG. 12 along section line 19-19 in FIG. 15, according to an implementation.

FIG. 19 is a diagram illustrating a cross-sectional view of the cover portion 1210 of the integrated shipping container and VR headset 1200 of FIG. 12 along the section line 19-19 in FIG. 15, according to an implementation. In comparison with FIGS. 13-18, the cover portion 1210, in the cross-sectional view of FIG. 19, is shown without the other elements of the integrated shipping container and VR headset 1200 of FIG. 12, so as not to obscure the view shown in FIG. 19.

In the cross-sectional view of FIG. 19, an arrangement of the aperture 1212 and the slot 1216 of the cover portion 1210 are shown. In other implementations, other arrangements for the aperture 1212 and the slot 1216 are possible. In still other implementations, the aperture 1212 and/or the slot 1216 can be eliminated. In yet other implementations, the cover portion 1210, as shown in FIG. 19, could include other elements, such as an input button, for example.

Figure 20:
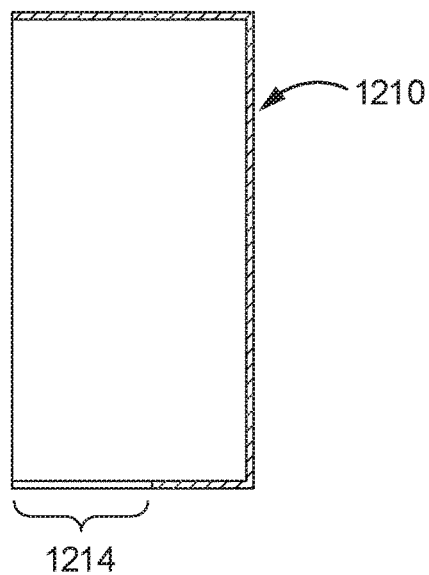
FIG. 20 is a diagram illustrating a cross-sectional view of the cover portion of the shipping container and VR headset of FIG. 12 along section line 20-20 in FIG. 15, according to an implementation.

FIG. 20 is a diagram illustrating a cross-sectional view of the cover portion 1210 of the integrated shipping container and VR headset 1200 of FIG. 1 along the section line 20-20 in FIG. 15, according to an implementation. As with FIG. 19, the cover portion 1210, in the cross-sectional view of FIG. 20, is shown without the other elements of the integrated shipping container and VR headset 1200 of FIG. 12, so as not to obscure the view shown in FIG. 20.

In the cross-sectional view of FIG. 20, an arrangement of the cutout 1214 (e.g., for placement over a user's nose) in the cover portion 1210 is shown. In other implementations, other arrangements for the cutout 1214 are possible. In still other implementations, the cover portion 1210, as shown in FIG. 20, could include other elements, such as an input button, for example.

Figure 21:
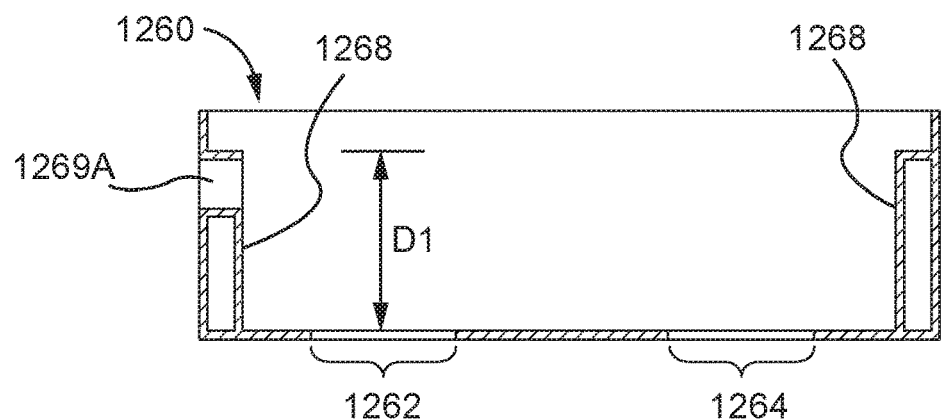
FIG. 21 is a diagram illustrating a cross-sectional view of a goggle portion of the shipping container and VR headset of FIG. 1 along section line 21-21 in FIG. 16, according to an implementation.

FIG. 21 is a diagram illustrating a cross-sectional view of the goggle portion 1260 of the integrated shipping container and VR headset 1200 of FIG. 1 along the section line 21-21 in FIG. 16, according to an implementation. As with the cross-sectional views of the cover portion 1210 shown in FIGS. 19 and 20, the chassis of the goggle portion 1260 is shown in the cross-sectional view of FIG. 21 without the other elements of the integrated shipping container and VR headset 1200 of FIG. 12, so as not to obscure the view shown in FIG. 21.

In the cross-sectional view of FIG. 21, an arrangement of the lens apertures 1262, 1264 and the magnet 1269 in the goggle portion 1260 are shown. In other implementations, other arrangements for the lens apertures 1262, 1264 and the magnet 1269A are possible. In still other implementations, the magnet 1269A could be eliminated and/or replaced with a different input mechanism, such as a button, for example. In still other implementations, the goggle portion 160, as shown in FIG. 21, could include other elements.

Also shown in FIG. 21, is an example arrangement for the ledge 1268 of the integrated shipping container and VR headset 1200. The ledge 1268 can be used (configured to, arrange to, etc.) support an electronic device for shipping (e.g., display side up) and for viewing VR content (e.g., display side down), such as was discussed above with respect to FIG. 12. The structure of the ledge 1268 shown in FIG. 21 (and in FIG. 22) is given by way of example and shown for purposes of illustration. In other implementations, a ledge of an integrated shipping container and VR headset can have other arrangements, such as those described herein.

The ledge 1268 can be defined (formed, constructed, etc.) using any number of appropriate materials, such as cardboard, fiberboard, plastic, paper pulp structures, etc. In certain implementations, the ledge 1268 can be integrated with the goggle portion 1260, affixed to the goggle portion 1260 (e.g., using an adhesive) or can be a separate structure that is placed inside the goggle portion 1268 in the arrangement shown in FIG. 21 (and FIGS. 12 and 22). As shown in FIG. 21, the structure of the ledge 1268 can have an opening to accommodate the magnet 1269A of the integrated shipping container and VR headset 1200 in this implementation.

As also shown in FIG. 21, the surface of the ledge 1268 on which an electronic device can be placed when viewing VR content with the integrated shipping container and VR headset 1200 can be a distance D1 from the lens apertures 1262, 1264 of the goggle portion 1260. In the integrated shipping container and VR headset 1200, a focal length of the aspherical lenses 1252, 1254 can be determined based on the distance D1, so as to improve a user's experience when viewing VR content using the integrated shipping container and VR headset 1200.

Figure 22:
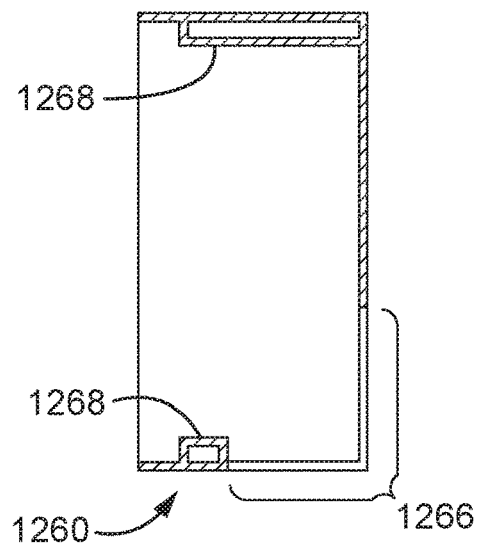
FIG. 22 is a diagram illustrating a cross-sectional view of the goggle portion of the shipping container and VR headset of FIG. 12 along section line 22-22 in FIG. 16, according to an implementation.

FIG. 22 is a diagram illustrating a cross-sectional view of the goggle portion 1260 of the integrated shipping container and VR headset 1200 of FIG. 12 along the section line 22-22 in FIG. 16, according to an implementation. As with FIG. 21, the chassis of the goggle portion 1260, in the cross-sectional view of FIG. 22, is shown without the other elements of the integrated shipping container and VR headset 1200 of FIG. 12, so as not to obscure the view shown in FIG. 22.

In the cross-sectional view of FIG. 22, an arrangement of the cutout 1266 (e.g., for placement over a user's nose) in the goggle portion 1260 is shown. In other implementations, other arrangements for the cutout 1266 are possible. In still other implementations, the goggle portion 1260, as shown in FIG. 22, could include other elements, such as an input mechanism.

Also shown in FIG. 22, the example arrangement for the ledge 1268 of the integrated shipping container and VR headset 1200 shown in FIG. 21 is further illustrated. As with FIG. 21, the structure of the ledge 1268 shown in FIG. 22 is given by way of example and shown for purposes of illustration. In other implementations, a ledge of an integrated shipping container and VR headset can have other arrangements, such as those described herein. For this example implementation, as shown in FIG. 22, the structure of the ledge 1268 can being arranged to accommodate the cutout 1266 of the integrated shipping container and VR headset 1200.

Figure 23:
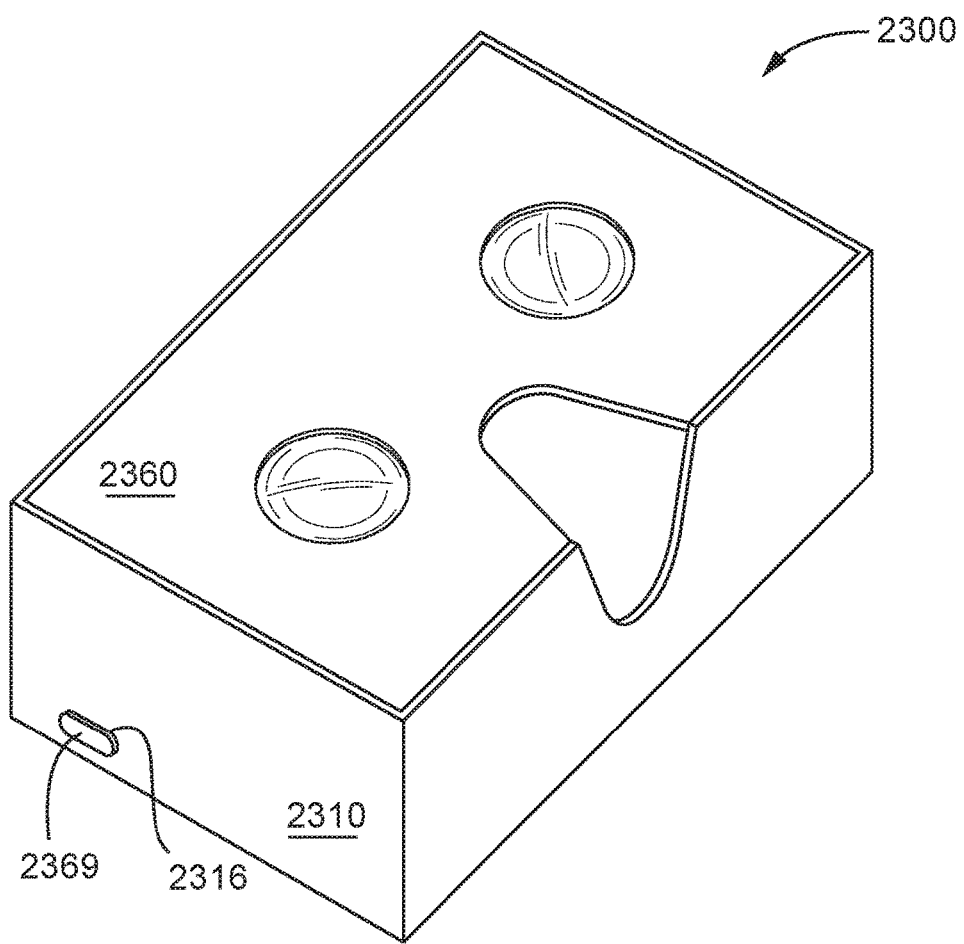
FIG. 23 is a diagram illustrating a front-side perspective view of another integrated shipping container and VR headset, according to an implementation.

FIG. 23 is a diagram illustrating a front-side perspective view of another integrated shipping container and VR headset 2300 (integrated VR headset 2300), according to an implementation. The integrated VR headset 2300 is similar to the integrated VR headset 1200. It will be appreciated, however, that integrated VR headsets having other configurations and arrangements are possible. For purposes of brevity and clarity, the details of the aspects of the integrated VR headset 2300 that are similar to those of the integrated VR headset 1200 are not described in detail again here with respect to FIG. 23.

As shown in FIG. 23, a cover portion 2310 of the integrated VR headset 2300 includes an aperture 2316 that facilitates access to a button 2369. In such an approach, the button 2368 can be affixed, attached to and/or integrated with a goggle portion 2360 of the integrated headset 2300. In the integrated VR headset 2300, the button 2369 can be located on the goggle portion 2360 such that it aligns with a button of a corresponding electronic device. For instance, the corresponding electronic device can be a device that is shipped using the integrated headset 2300 as shipping container (e.g., along with an outer sleeve and a protective liner, such as those described herein).

In such an approach, the location of the button 2369 can be based on the specific electronic device (or electronic devices) for which the integrated VR headset 2300 is designed to be used as shipping container and VR headset for. In other words, the location of the button 2369 can depend on where input buttons of a corresponding electronic device (or devices) that are suitable for use in interacting with VR applications and/or content are located on the corresponding electronic device (or devices). Accordingly, in other implementations, the location of the button 2369 can vary, such as based on the specific electronic device (or devices) that are to be shipped using the integrated headset 2300, as well use the integrated VR headset 2300 to view images associated with VR applications and/or VR content.

FIGS. 24A-24D, 25A-25D, 26A-26D and 27A-27D are diagrams illustrating example configurations of ledge structures that can be implemented in an integrated mobile device shipping container (packaging) and VR headset, according to implementations. In FIGS. 24A-27D, elements of integrated shipping container and VR headsets 2400, 2500, 2600 and 2700 are shown to illustrate these example ledge configurations. For purposes of clarity, other elements of the integrated shipping container and VR headsets 2400, 2500, 2600 and 2700 are not shown in FIG. 24A-27D. For instance, FIGS. 24A-27D do not illustrate cutouts (e.g., for placement over a user's nose), input mechanisms, lens apertures, lenses, and so forth. It will be appreciated that these aspects of an integrated shipping container and VR headset can be incorporated in the implementations shown in FIGS. 24A-27D.

Figure 24A:
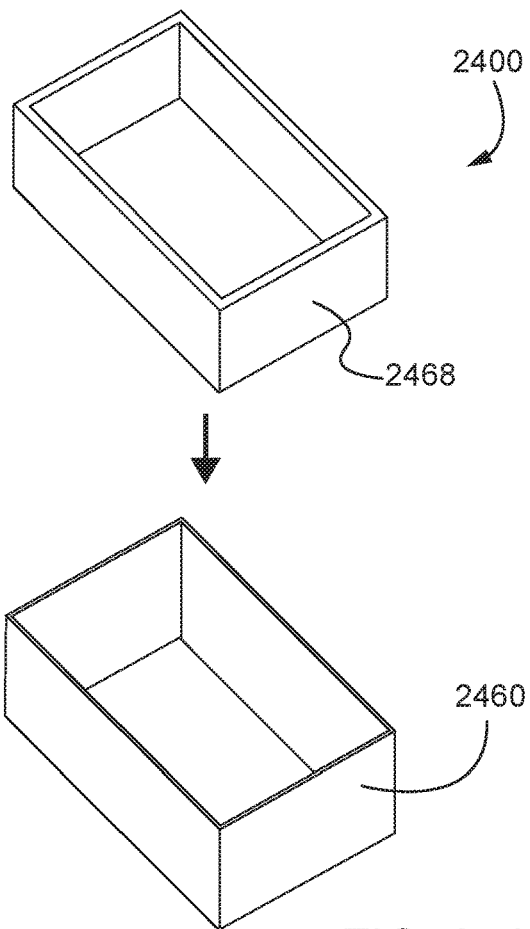
FIGS. 24A-24D are diagrams illustrating a ledge for supporting a mobile device in an integrated mobile device shipping container (packaging) and VR headset, according to an implementation.
Figure 24B:
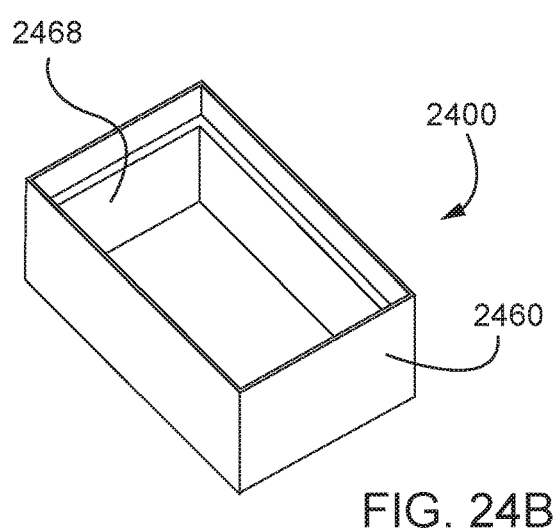

FIGS. 24A and 24B illustrate perspective views of a goggle portion 2460 and a ledge (ledge structure) 2468 of an integrated shipping container and VR headset 2400, according to an implementation. As shown in the perspective views FIGS. 24A and 24B, the ledge 2468 can be inserted into the goggle portion 2460 to define a ledge within the goggle portion 2460 that can be used to support an electronic device (such as the electronic device 1220 discussed above), during shipment (e.g., in display face-up position) and for viewing VR content on the electronic device (e.g., in a display face-down position). The ledge 2468 can be affixed to the goggle portion 2460 using a number of approaches, such as adhesive strips, glue, etc. In other implementations, the ledge 2468 can be sized such that it is frictionally retained within the goggle portion 2460 without use adhesives (or otherwise). The goggle portion 2460 and the ledge 2468 can be constructed from any number of appropriate materials, such as those described herein.

Figure 24C:
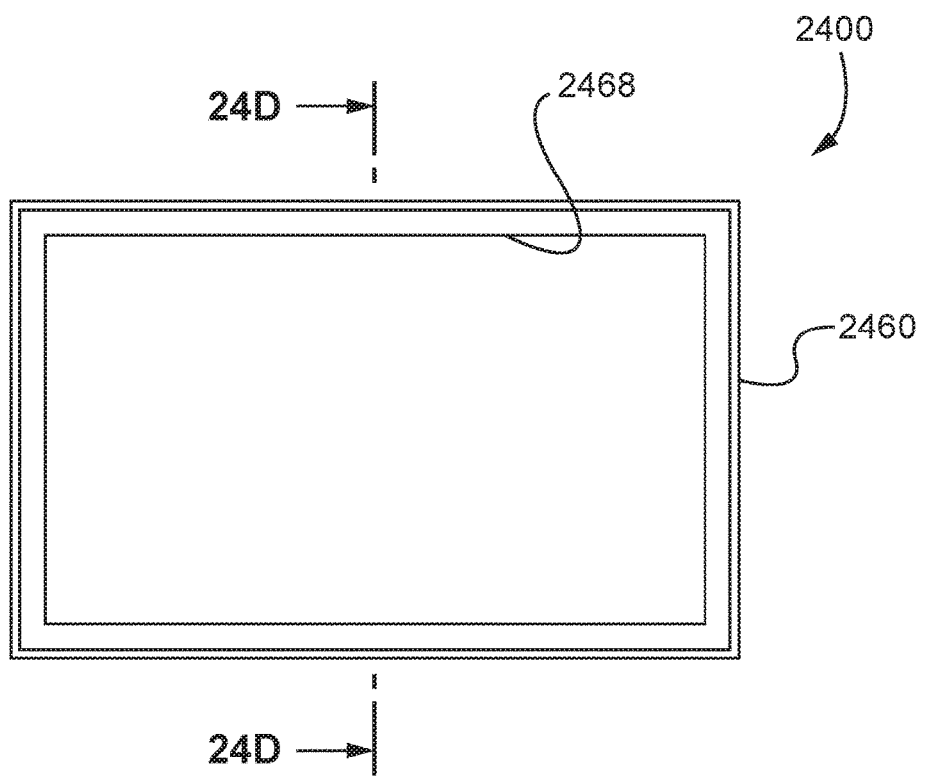
Figure 24D:
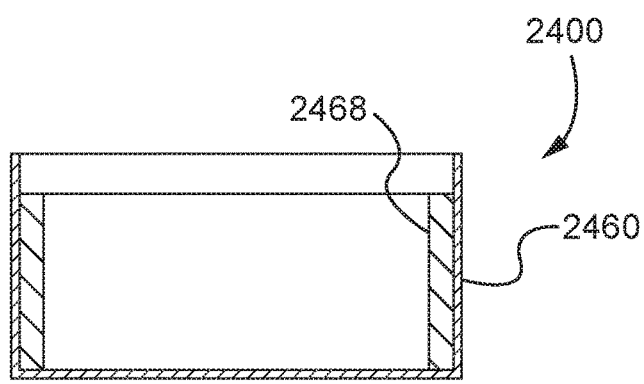

FIG. 24C is a drawing illustrating a top-side plan view of the integrated shipping container and VR headset 2400 in the configuration illustrated in FIG. 24B. As shown in the FIG. 24C, the ledge 2468 can be disposed around an interior perimeter of the goggle portion 2460. FIG. 24C also illustrates a section line 24D-24D, which indicates a cut line for a cross-sectional view of the integrated shipping container and VR headset 2400 that is shown in FIG. 24D. As shown in the cross sectional view of FIG. 24D, the ledge 2468 can be disposed within the goggle portion 2460, and can rest on (be disposed on) an inner surface of a bottom wall of the goggle portion 2460. The ledge 2468 can define a ledge within (recessed within) the goggle portion 2460 that is configured to support and electronic device (e.g., for shipment and/or viewing of VR content). As described herein, a cover portion (not shown) could be placed over the goggle portion 2460 to retain the electronic device within the goggle portion 2460.

Figure 25A:
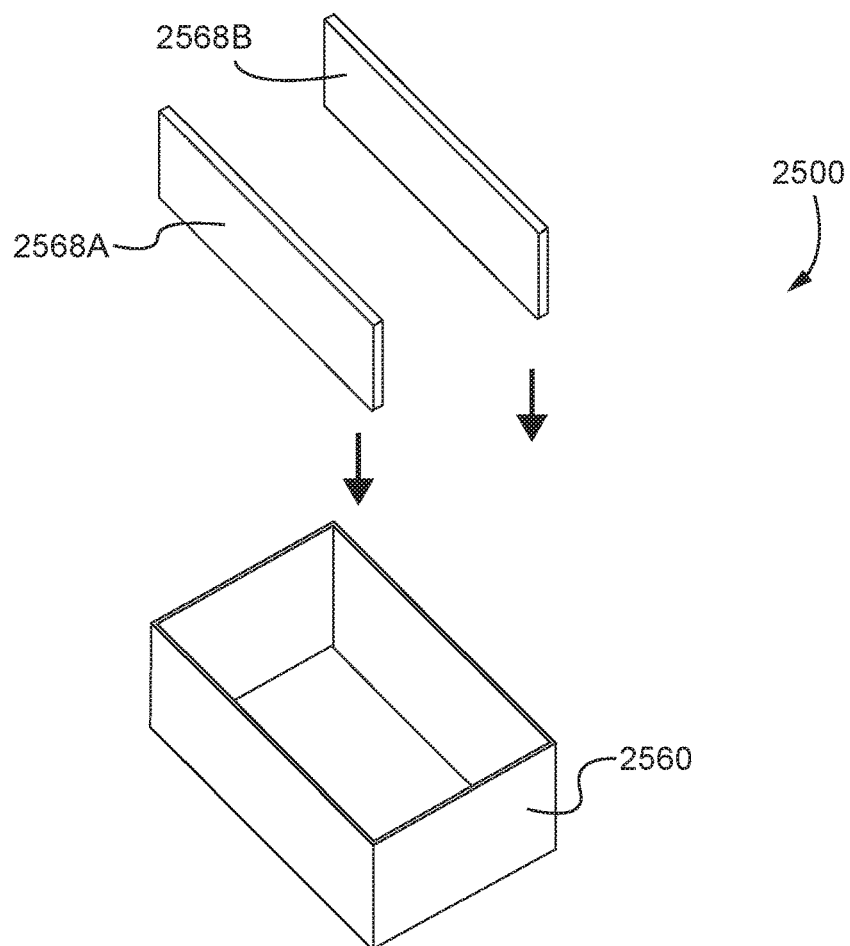
FIGS. 25A-25D are diagrams illustrating another ledge for supporting a mobile device in an integrated mobile device shipping container (packaging) and VR headset, according to an implementation.
Figure 25B:
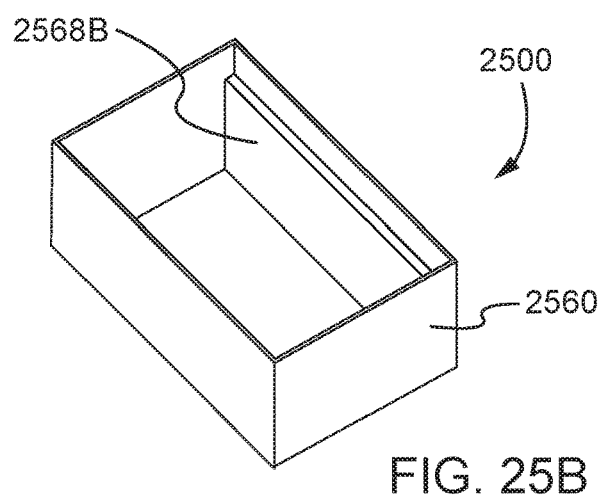

FIGS. 25A and 25B illustrate perspective views of a goggle portion 2560 and ledge (ledge structure) components 2568A, 2568B of an integrated shipping container and VR headset 2500, according to an implementation. As shown in the perspective views FIGS. 25A and 25B, the ledge components 2568A, 2568B can be inserted into the goggle portion 2560 to define a ledge within the goggle portion 2560 that can be used to support an electronic device (such as the electronic device 1220 discussed above), during shipment (e.g., in display face-up position) and for viewing VR content on the electronic device (e.g., in a display face-down position). The ledge components 2568A, 2568B can be affixed to the goggle portion 2560 using a number of approaches, such as adhesive strips, glue, etc. In other implementations, the ledge components 2568A, 2568B can be sized such that they are frictionally retained within the goggle portion 2560 without use of adhesives (or otherwise). The goggle portion 2560 and the ledge components 2568A, 2568B can be constructed from any number of appropriate materials, such as those described herein.

Figure 25C:
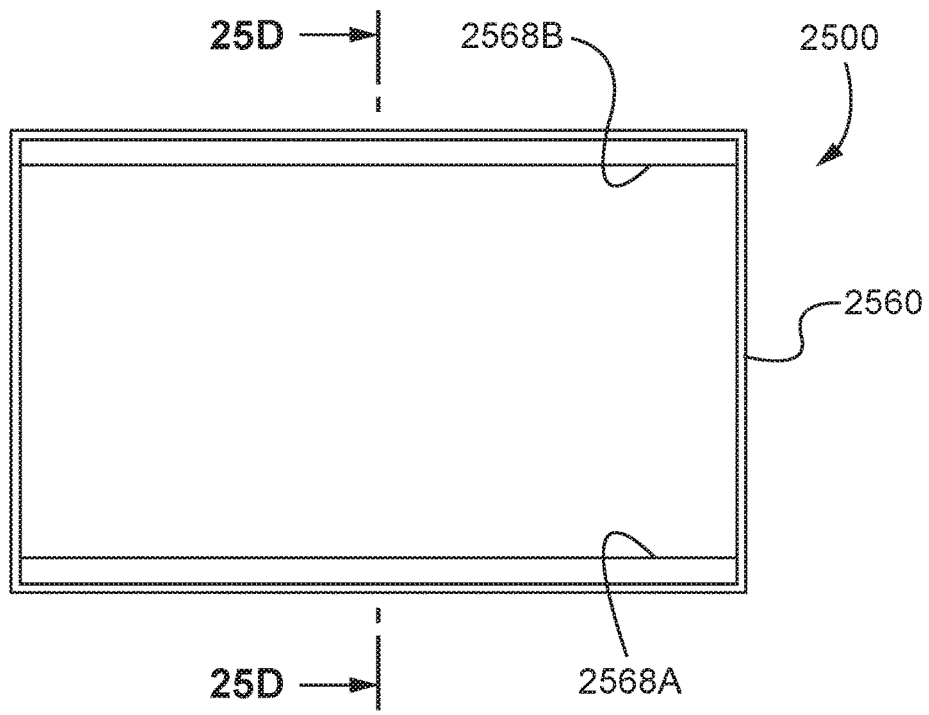
Figure 25D:
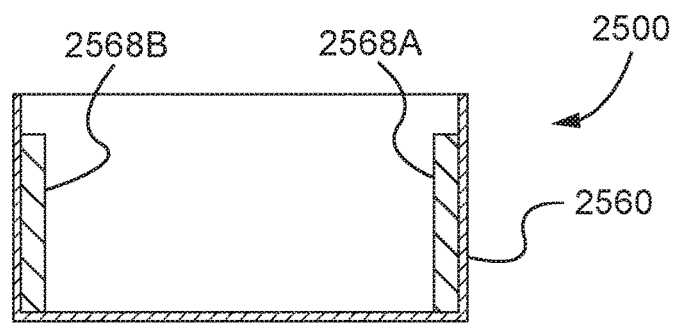

FIG. 25C is a drawing illustrating a top-side plan view of the integrated shipping container and VR headset 2500 in the configuration illustrated in FIG. 25B. As shown in the FIG. 25C, the ledge components 2568A, 2568B can be disposed along respective inner surfaces of opposing walls of the goggle portion 2560. FIG. 25C also illustrates a section line 25D-25D, which indicates a cut line for a cross-sectional view of the integrated shipping container and VR headset 2500 that is shown in FIG. 25D. As shown in the cross sectional view of FIG. 25D, the ledge components 2568A, 2568B can be disposed along opposing walls within the goggle portion 2560, also resting on an inner surface of a bottom wall of the goggle portion 2560. The ledge components 2568A, 2568B, as shown in FIG. 25D, can define a ledge within (recessed within) the goggle portion 2560 that is configured to support an electronic device (e.g., for shipment and/or viewing of VR content). As described herein, a cover portion (not shown) could be placed over the goggle portion 2560 to retain the electronic device within the goggle portion 2560.

Figure 26A:
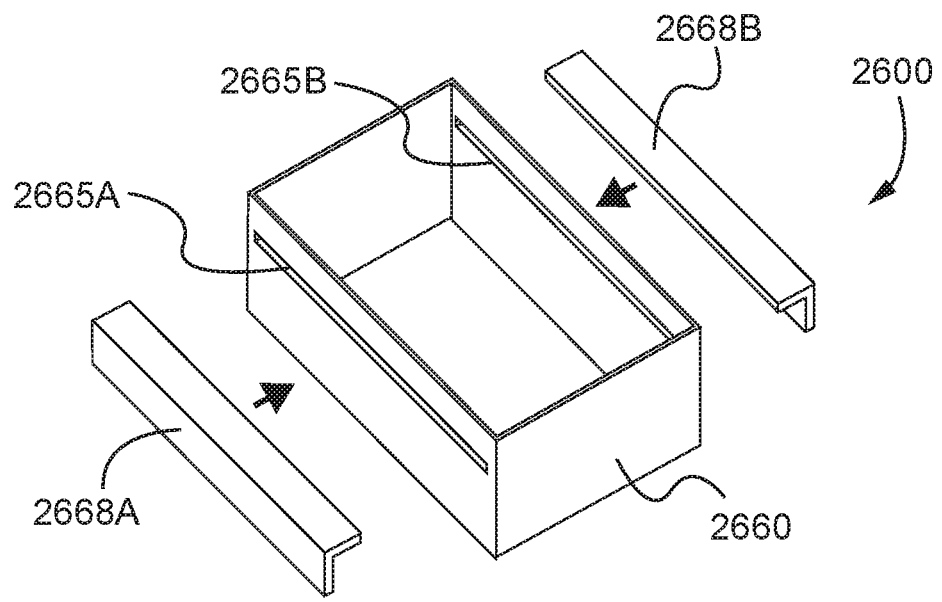
FIGS. 26A-26D are diagrams illustrating yet another ledge for supporting a mobile device in an integrated mobile device shipping container (packaging) and VR headset, according to an implementation.
Figure 26B:
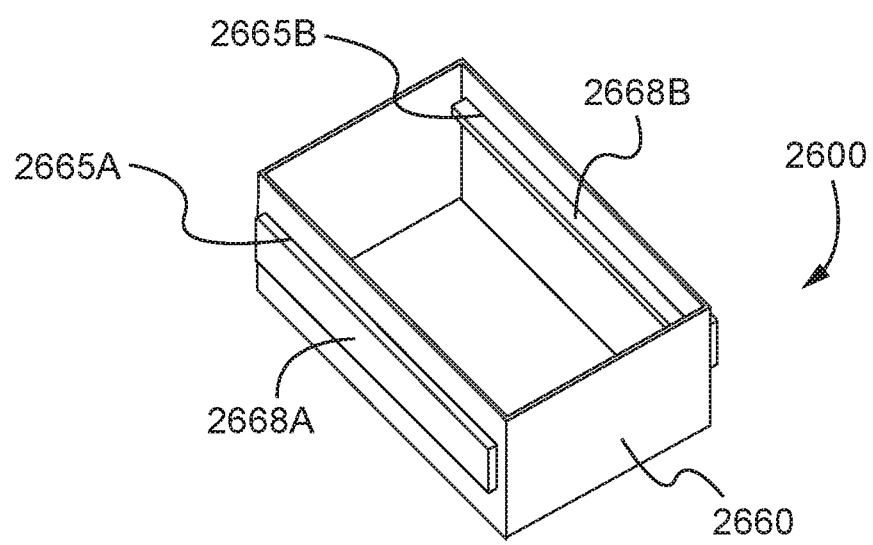

FIGS. 26A and 26B illustrate perspective views of a goggle portion 2660 and ledge (ledge structure) components 2668A, 2668B of an integrated shipping container and VR headset 2600, according to an implementation. As shown in the perspective views FIGS. 26A and 26B, the ledge components 2668A, 2668B can be inserted into respective slots 2665A, 2665B defined in the goggle portion 2660, so as to define a ledge within the goggle portion 2660 that can be used to support an electronic device (such as the electronic device 1220 discussed above), during shipment (e.g., in display face-up position) and for viewing VR content on the electronic device (e.g., in a display face-down position). The ledge components 2668A, 2668B can be affixed to the goggle portion 2660 using a number of approaches, such as adhesive strips, glue, etc. In other implementations, other approaches can be used to retain the ledge components 2668A, 2668B within their respective slots 2665A, 2665B. The goggle portion 2660 and the ledge components 2668A, 2668B can be constructed from any number of appropriate materials, such as those described herein.

Figure 26C:
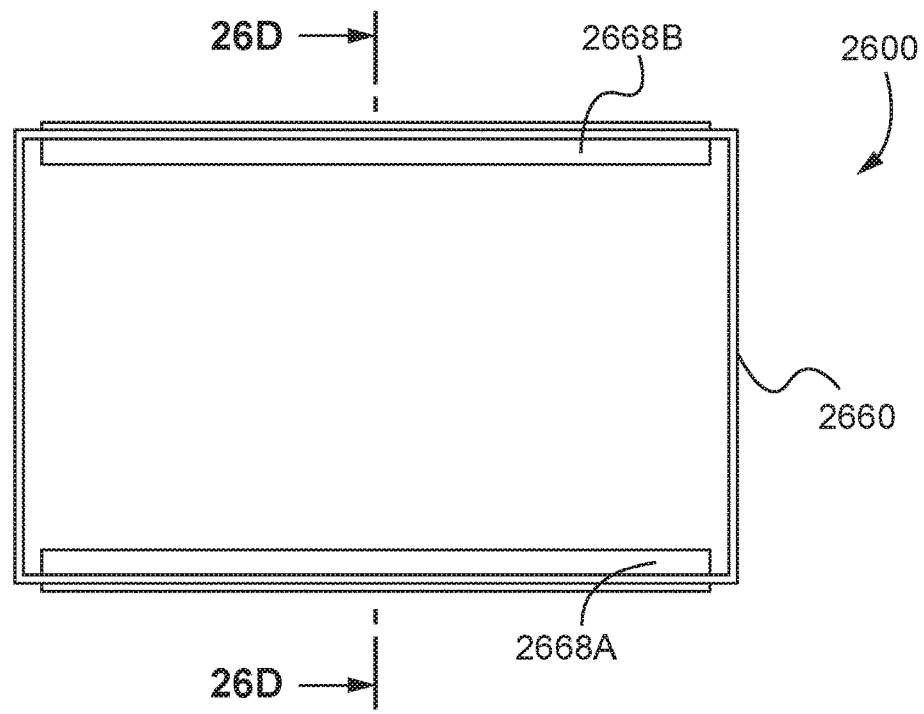
Figure 26D:
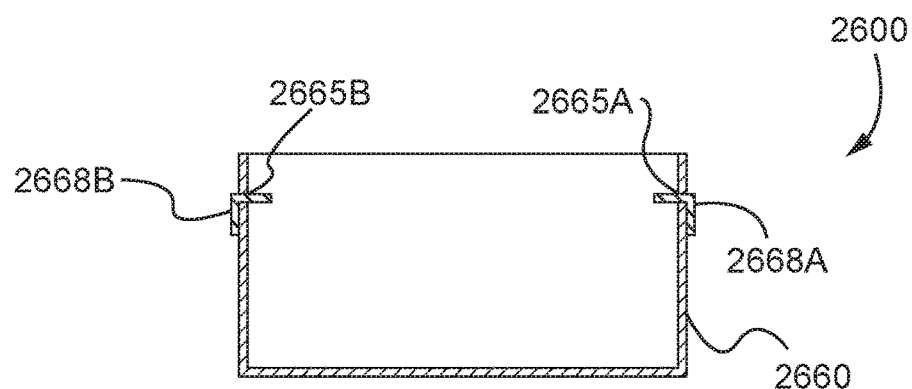

FIG. 26C is a drawing illustrating a top-side plan view of the integrated shipping container and VR headset 2600 in the configuration illustrated in FIG. 26B. As shown in the FIG. 26C, the ledge components 2668A, 2668B can be disposed along respective exterior surfaces of opposing walls of the goggle portion 2660 and extend into the goggle portion 2660 to form opposing sides of a ledge. FIG. 26C also illustrates a section line 26D-26D, which indicates a cut line for a cross-sectional view of the integrated shipping container and VR headset 2600 that is shown in FIG. 26D. As shown in the cross sectional view of FIG. 26D, the ledge components 2668A, 2668B can be disposed along exterior surfaces of opposing walls of the goggle portion and extend into the goggle portion 2660. The ledge components 2668A, 2668B, as shown in FIG. 26D, can define a ledge within (recessed within) the goggle portion 2660 that is configured to support an electronic device (e.g., for shipment and/or viewing of VR content). As described herein, a cover portion (not shown) could be placed over the goggle portion 2660 to retain the electronic device within the goggle portion 2660.

Figure 27A:
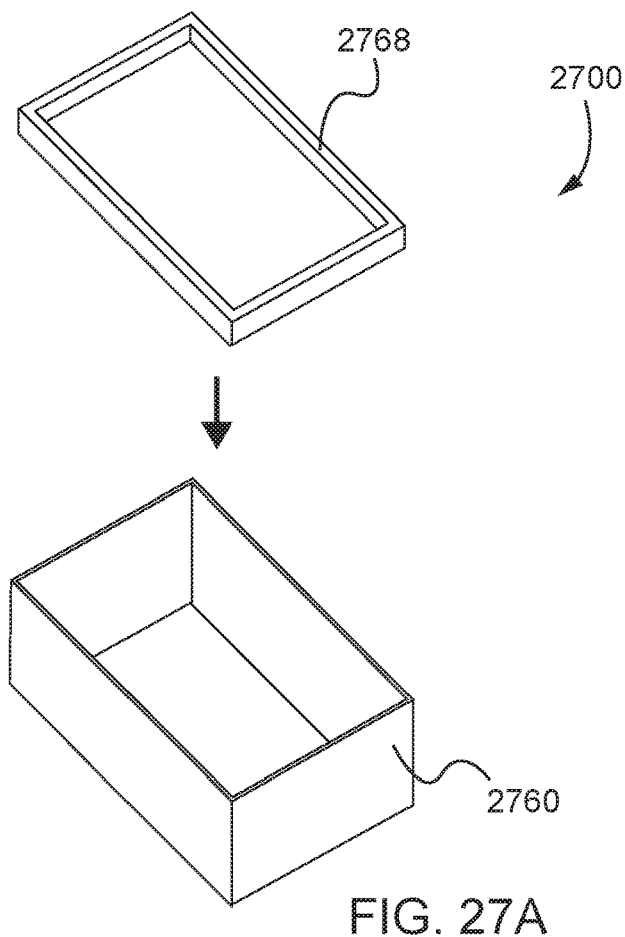
FIGS. 27A-27D are diagrams illustrating still another alternative ledge for supporting a mobile device in an integrated mobile device shipping container (packaging) and VR headset, according to an implementation.
Figure 27B:
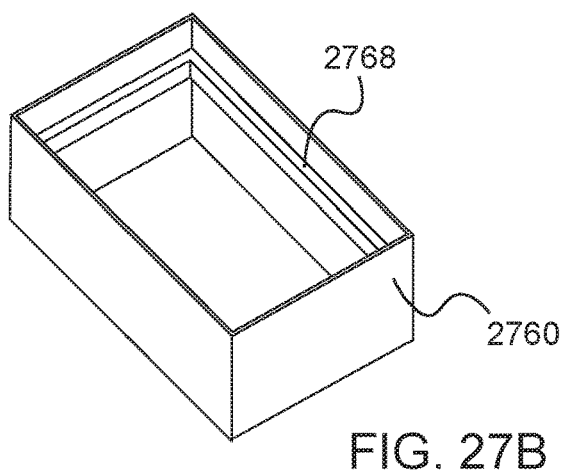

FIGS. 27A and 27B illustrate perspective views of a goggle portion 2760 and a ledge (ledge structure) 2768 of an integrated shipping container and VR headset 2700, according to an implementation. As shown in the perspective views FIGS. 27A and 27B, the ledge 2768 can be inserted into the goggle portion 2760 to define a ledge within the goggle portion 2760 that can be used to support an electronic device (such as the electronic device 1220 discussed above), during shipment (e.g., in display face-up position) and for viewing VR content on the electronic device (e.g., in a display face-down position). The ledge 2768 can be affixed to the goggle portion 2760 using a number of approaches, such as adhesive strips, glue, etc. In other implementations, other approaches can be used to retain the ledge 2768 in a fixed position within the goggle portion 2760

(such as illustrated in FIG. 27B). The goggle portion 2760 and the ledge 2768 can be constructed from any number of appropriate materials, such as those described herein.

Figure 27C:
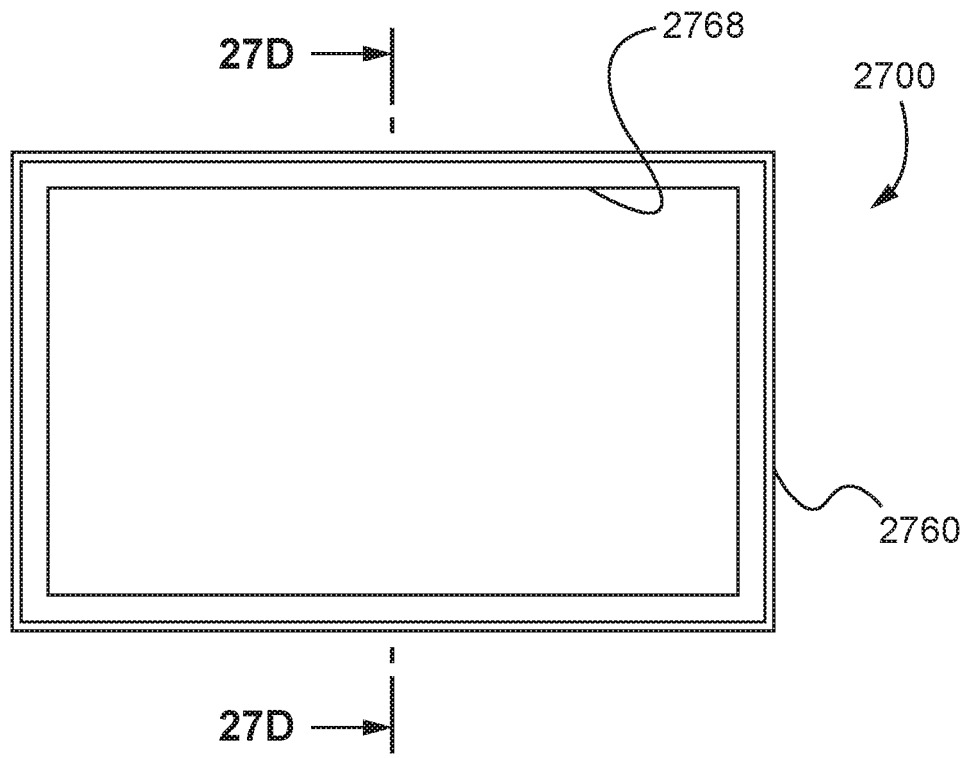
Figure 27D:
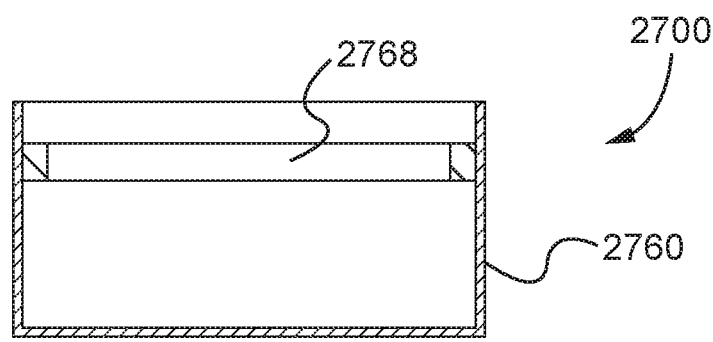

FIG. 27C is a drawing illustrating a top-side plan view of the integrated shipping container and VR headset 2700 in the configuration illustrated in FIG. 27B. As shown in the FIG. 27C, the ledge 2768 can be disposed around an interior perimeter of the goggle portion 2760. FIG. 27C also illustrates a section line 27D-27D, which indicates a cut line for a cross-sectional view of the integrated shipping container and VR headset 2700 that is shown in FIG. 27D. As shown in the cross sectional view of FIG. 27D, the ledge 2768 can be disposed within (recessed within) the goggle portion 2760. The ledge 2768 can define a ledge within the goggle portion 2760 that is configured to support and electronic device (e.g., for shipment and/or viewing of VR content). As described herein, a cover portion (not shown) could be placed over the goggle portion 2760 to retain the electronic device within the goggle portion 2760.

In a general aspect, an apparatus can include a goggle portion having a chassis that is open on a first side, a lens assembly disposed on a second side of the chassis of the goggle portion and a ledge disposed around an interior perimeter of the chassis of the goggle portion. The ledge can be configured to physically support an electronic device inserted from the first side of the chassis of the goggle portion. The apparatus can also include a cover portion having a chassis that is open on a first side and at least partially closed on a second side. The cover portion can be configured to be placed over the goggle portion, such that at least a portion of the goggle portion is disposed within the cover portion and the electronic device is retained between the ledge and an interior surface of the second side of the cover portion.

Implementations can include one or more of the following features. For instance, the chassis of the goggle portion can includes a left wall, a right wall, a bottom wall and a top wall. The left wall, the right wall, the bottom wall and the top wall of the goggle portion can define the open, first side of the goggle portion. The lens assembly and the bottom wall can have a cutout defined therein. The cutout can be configured for placement over a nose of a user.

The chassis of the cover portion can include a left wall, a right wall, a bottom wall and a top wall. The left wall, the right wall, the bottom wall and the top wall of the cover portion can define the open, first side of the cover portion. The bottom wall can have a cutout defined therein. The cutout can be configured for placement over a nose of a user.

The lens assembly can include a first aperture, a second aperture, a first aspherical lens disposed within the first aperture and a second aspherical lens disposed within the second aperture. A focal length of the first aspherical lens and a focal length of the second aspherical lens can be based, at least in part, on a distance from the lens assembly to a surface of a display of the electronic device when the electronic device is placed on the ledge with the display facing the lens assembly.

The second side of the cover portion can have an aperture defined therein. The aperture can be configured to expose a camera of the electronic device when the electronic device is placed on the ledge with the camera facing the second side of the cover portion and the cover portion is placed over the goggle portion.

The apparatus can include an input mechanism disposed on the chassis of the goggle portion. The input mechanism can be configured to interact with the electronic device. The input mechanism can include a magnetic input device. The input mechanism can include a button. The input mechanism can be disposed on one of the left wall of the chassis of the goggle portion and the right wall of the chassis of the goggle portion. The chassis of the cover portion can include an aperture that is configured to facilitate access to the input mechanism when the cover portion is placed over the goggle portion.

The apparatus can include a sleeve configured to slidably fit over the goggle portion and the cover portion when the cover portion is placed over the goggle portion. The apparatus can include a protective liner configured to be placed within the goggle portion to cover the lens assembly. The protective liner can include a tab disposed thereon, the tab being configured to facilitate removal of the protective liner from the goggle portion.

In another general aspect, an article of manufacture can include a goggle portion having a chassis that is open on a first side, a lens assembly disposed on a second side of the chassis of the goggle portion and a ledge disposed around an interior perimeter of the chassis of the goggle portion. The article of manufacture can also include a cover portion having a chassis that is open on a first side and at least partially closed on a second side. The cover portion can be configured to be placed over the goggle portion, such that at least a portion of the goggle portion is disposed within the cover portion. The article of manufacture can further include a protective liner configured to be placed within the goggle portion to cover the lens assembly. The article of manufacture can also further include a sleeve configured to slidably fit over the goggle portion and the cover portion when the cover portion is placed over the goggle portion.

Implementations can include one or more of the following features. For instance, the lens assembly can include a first aperture, a second aperture, a first aspherical lens disposed within the first aperture and a second aspherical lens disposed within the second aperture. The article of manufacture can include an input mechanism disposed on the chassis of the goggle portion, the input mechanism being configured to interact with an electronic device disposed within the article of manufacture. The protective liner can include a tab disposed thereon, the tab being configured to facilitate removal of the protective liner from the goggle portion.

A number of implementations have been described. Nevertheless, it will be understood that various modifications can be made without departing from the spirit and scope of the invention.

What is claimed is:

1. An apparatus comprising:
   a container that is both a shipping container for a mobile electronic device and a virtual reality headset, the container including:
   a base portion that is open on a first side;
   a first lens and a second lens disposed within a second side of the base portion;
   a ledge disposed around at least a portion of an interior perimeter of the base portion, the ledge being configured to physically support an electronic device inserted from the first side of the base portion;
   a lid portion that is open on a first side and closed on a second side; and
   a hinge coupling the base portion with the lid portion,
   the base portion, the lid portion and the hinge being configured such that the base portion and the lid portion are hingeably moveable, relative to one another, between an open position and a closed position.

2. The apparatus of claim 1, wherein the base portion and the lid portion have corresponding angled mating surfaces.

3. The apparatus of claim 1, wherein the base portion includes:
an outer base portion having a first lens aperture and a second lens aperture;
an inner base portion having:
a first lens aperture aligned with the first lens aperture of the outer base portion; and
a second lens aperture aligned with the second lens aperture of the outer base portion; and
an adhesive layer affixing the inner base portion to the outer base portion, the inner base portion being at least partially disposed within the outer base portion.

4. The apparatus of claim 3, wherein:
the first lens and the second lens are fixedly retained between the inner base portion and the outer base portion;
an optical portion of the first lens is disposed within the first lens aperture of the inner base portion and the first lens aperture of the outer base portion; and
an optical portion of the second lens is disposed within the second lens aperture of the inner base portion and the second lens aperture of the outer base portion.

5. The apparatus of claim 3, wherein the first lens and the second lens each include a plurality of tabs configured to fixedly retain the first lens and the second lens between the inner base portion and the outer base portion.

6. The apparatus of claim 1, wherein the base portion and the lid portion have a cutout defined therein, the cutout being configured for placement over a nose of a user.

7. The apparatus of claim 1, further comprising a button mechanism affixed with the base portion, the button mechanism being configured to selectably interact with a touchscreen of the electronic device.

8. The apparatus of claim 7, wherein the base portion includes an aperture that is associated with the button mechanism, a portion of the button mechanism being exposed through the aperture.

9. The apparatus of claim 7, wherein the button mechanism includes a conductive material.

10. The apparatus of claim 7, wherein the base portion includes an inner base portion and an outer base portion, the button mechanism being fixedly retained between the inner base portion and the outer base portion, the inner base portion including a cutout configured to receive a portion of the button mechanism, the outer base portion including an aperture that is associated with the button mechanism, a portion of the button mechanism being exposed through the aperture.

11. The apparatus of claim 7, wherein the base portion includes an inner base portion and an outer base portion, the inner base portion including a recessed portion, the button mechanism being fixedly attached to the recessed portion, such that the button mechanism is fixedly retained between the inner base portion and the outer base portion, the inner base portion including a cutout configured to receive a portion of the button mechanism.

12. The apparatus of claim 1, wherein the hinge includes:
a first hinge portion coupled with at least one interior surface of the apparatus; and
a second hinge portion coupled with at least one exterior surface of the apparatus.

13. An article of manufacture comprising:
a container that is both a shipping container for a mobile electronic device and a virtual reality headset, the container including:
a base portion that is open on a first side;
a first lens and a second lens disposed within a second side of the base portion;
a ledge disposed around at least a portion of an interior perimeter of the base portion, the ledge being configured to physically support an electronic device inserted from the first side of the base portion;
a lid portion that is open on a first side and closed on a second side; and
a hinge coupling the base portion with the lid portion, the base portion, the lid portion and the hinge being configured such that the base portion and the lid portion are hingeably moveable, relative to one another, between an open position and a closed position;
a sleeve configured to slidably fit over the base portion and the lid portion when in the closed position; and
a tray configured to be placed within the base portion, the tray including a plurality of legs configured to prevent physical contact between the tray and the first lens and the second lens.

14. The article of manufacture of claim 13, wherein the tray is configured to contain at least one accessory for the electronic device.

15. The article of manufacture of claim 13, wherein the base portion and the lid portion have corresponding angled mating surfaces.

16. The article of manufacture of claim 13, wherein the base portion includes:
an outer base portion having a first lens aperture and a second lens aperture;
an inner base portion having:
a first lens aperture aligned with the first lens aperture of the outer base portion; and
a second lens aperture aligned with the second lens aperture of the outer base portion; and
an adhesive layer affixing the inner base portion to the outer base portion, the inner base portion being at least partially disposed within the outer base portion.

17. The article of manufacture of claim 16, wherein:
the first lens and the second lens are fixedly retained between the inner base portion and the outer base portion;
an optical portion of the first lens is disposed within the first lens aperture of the inner base portion and the first lens aperture of the outer base portion; and
an optical portion of the second lens is disposed within the second lens aperture of the inner base portion and the second lens aperture of the outer base portion.

18. The article of manufacture of claim 13, wherein the base portion and the lid portion have a cutout defined therein, the cutout being configured for placement over a nose of a user.

19. The article of manufacture of claim 13, further comprising a button mechanism affixed with the base portion, the button mechanism being configured to selectably interact with a touchscreen of the electronic device.

20. The article of manufacture of claim 13, wherein the hinge includes:
a first hinge portion coupled with at least one interior surface of one of the base portion or the lid portion; and
a second hinge portion coupled with at least one exterior surface of the apparatus other of the base portion or the lid portion.

21. An apparatus comprising:
a container that is both a shipping container for a mobile electronic device and a virtual reality headset, the container including:

a goggle portion including:
  a chassis that is open on a first side;
  a lens assembly disposed on a second side of the chassis of the goggle portion, the second side being opposite the first side of the chassis of the goggle portion; and
  a ledge disposed around at least a portion of an interior perimeter of the chassis of the goggle portion, the ledge being configured to physically support the mobile electronic device when inserted from the first side of the chassis of the goggle portion; and
a cover portion that is open on a first side and at least partially closed on a second side,
the cover portion being configured to be placed over the first side of the chassis of the goggle portion, such that the mobile electronic device is retained between the ledge and an interior surface of the second side of the cover portion.

22. The apparatus of claim 21, wherein the chassis of the goggle portion includes a left wall, a right wall, a bottom wall and a top wall, the left wall, the right wall, the bottom wall and the top wall defining the open, first side of the goggle portion.

23. The apparatus of claim 22, wherein the lens assembly and the bottom wall have a cutout defined therein, the cutout being configured for placement over a nose of a user.

24. The apparatus of claim 21, wherein the cover portion includes a left wall, a right wall, a bottom wall and a top wall, the left wall, the right wall, the bottom wall and the top wall defining the open, first side of the cover portion.

25. The apparatus of claim 21, wherein the lens assembly includes:
  a first aperture;
  a second aperture;
  a first aspherical lens disposed within the first aperture; and
  a second aspherical lens disposed within the second aperture,
  a focal length of the first aspherical lens and a focal length of the second aspherical lens being based, at least in part, on a distance from the lens assembly to a surface of a display of the mobile electronic device when the mobile electronic device is placed on the ledge with the display facing the lens assembly.

* * * * *

UNITED STATES PATENT AND TRADEMARK OFFICE
CERTIFICATE OF CORRECTION

PATENT NO. : 10,139,637 B2  
APPLICATION NO. : 15/052432  
DATED : November 27, 2018  
INVENTOR(S) : Costa et al.

Page 1 of 1

It is certified that error appears in the above-identified patent and that said Letters Patent is hereby corrected as shown below:

On the Title Page

Item [56], under "U.S. PATENT DOCUMENTS", Line 31, delete "Dolly" and insert -- Goossens et al. --, therefor.

In the Claims

Column 34, Claim 20, Line 62, delete "the apparatus" and insert -- the --, therefor.

Signed and Sealed this  
Fifth Day of March, 2019

Andrei Iancu  
*Director of the United States Patent and Trademark Office*